March 9, 1954 K. M. GAVER ET AL 2,671,779
CARBOHYDRATE PRODUCTS AND PROCESSES THEREFOR
Filed June 8, 1948 6 Sheets-Sheet 3

INVENTOR.
KENNETH M. GAVER
BY ESTHER P. LASURE
DERK V. TIESZEN
ATTORNEY

March 9, 1954     K. M. GAVER ET AL     2,671,779
CARBOHYDRATE PRODUCTS AND PROCESSES THEREFOR
Filed June 8, 1948     6 Sheets-Sheet 6

INVENTOR.
KENNETH M. GAVER
ESTHER P. LASURE
BY DERK V. TIESZEN
ATTORNEY

UNITED STATES PATENT OFFICE 2,671,779

CARBOHYDRATE PRODUCTS AND PROCESSES THEREFOR

Kenneth M. Gaver and Esther P. Lasure, Columbus, Ohio, and Derk V. Tieszen, Delmar, N. Y., assignors to Ohio State University Research Foundation, a corporation of Ohio Application June 8, 1948, Serial No. 31,696

30 Claims. (Cl. 260—233.3)

The invention disclosed in this application relates to new compositions of matter and new processes for the formation of such compositions. The processes described herein illustrating our invention are designed to produce new products from carbohydrates and similar compounds. Any compound having a hydroxyl or an analogous group (nitrogen or other nonmetal analogue) in a position adjacent to a carbonyl group or to a potential carbonyl group can be considered a carbohydrate or a similar compound and when manipulated according to our processes reacts similarly. Such carbohydrates and similar compounds are herein termed "carbohydric compounds" or "carbohydric substances" which terms are hereby defined as used in this specification and claims as compounds having a hydroxyl or an analagous group (nitrogen or other nonmetal analogue) in a position adjacent to a carbonyl group or a potential carbonyl group. Our processes when applied to carbohydrates ordinarily include first the synthesis of either a monoalkali carbohydrate or a polyalkali carbohydrate; then the substitution of an organic group or organic groups in place of the alkali substituent or substituents to block further reaction at that point; and thereafter at least a second reaction with an alkaline material to substitute one or more additional alkali groups at another position of the original compound, thus forming a mixed organic alkali substituted product.

Our new processes are applicable to all types of carbohydrates such as monosaccharides, disaccharides, trisaccharides, tetrasaccharides and polyamyloses which are sometimes collectively designated as sugars; polysaccharides including polypentoses and polyhexoses, the latter including dextrins, starches, cellulose, lichenin, dextran, glycogen, etc.; conjugated saccharides including gums, glucosides and tannins; and derived saccharides. As stated above, it is also applicable to other compounds similar to carbohydrates provided such compounds have a hydroxyl group (or nonmetal analogue thereof) attached to a carbon which is adjacent to a carbonyl group or a potentially carbonyl group.

After the formation of the mixed organic alkali compound as mentioned above, the compound may, if desired, be again reacted with an organic reactant to substitute one or more organic groups in place of the alkali substituents so as to form a mixed polyorganic compound. The reaction with the alkali or such reaction and the substitution of an organic group in place of the alkali may in certain instances be repeated again.

One of the objects of our invention is the provision of new and useful processes of forming new and useful carbohydrates and similar products.

A further object of our invention is the provision of new and useful products formed from carbohydric compounds.

A further more specific object of our invention is the provision of new and useful processes for forming various new products from starch.

A further object of our invention is the provision of new and useful processes for forming various new alcoholates of starch and of other carbohydrates.

A further object of our invention is the provision of new and useful processes of forming polysubstituted products from starch and from other carbohydric compounds.

Further objects of our invention are (1) the provision of organic derivatives of polyalkali metal alcoholates of starch and other carbohydrates in which the organic substituents are selectively distributed on the various carbon groups as may be desired, and (2) the provision of processes of forming them.

Further objects and features of our invention will be apparent from the following description, reference being had to the accompanying drawings wherein preferred forms of embodiments of the invention are clearly shown in illustration of our inventions.

While as stated above our inventions are not limited to their application to starches, it is convenient to illustrate them as applied thereto.

Thus in carrying out certain embodiments of our process, we produce from starch certain new compounds which we have discovered and synthesized by our processes which are in the nature of alcoholates or ethers of starch. To designate these compounds, we have coined the word starchate which we define as follows: "Starchate" means, and is used heretofore and hereafter in this specification and in the claims hereof in the sense of, a compound composed of an undetermined number of polymerized glucopyranose units wherein a metallic atom or other inorganic group or organic radical has been substituted for each of the hydrogen atoms of one or more of the several hydroxyl groups of the starch unit so as to form a polymerized compound which in fact is (or is at least analogous to) an alcoholate of starch, wherein one or more of the hydroxyl hydrogens of the starch unit has been replaced.

By the substitution, as suggested above, of alkali metal atoms for one or more hydroxyl hydrogen atoms of the carbohydrate molecules, (or of each unit thereof as in the case of the glucopyranose units of the starch molecule) we produce a mono or poly alkali carbohydrate. We may then treat the alkali carbohydrate so formed to produce derivatives thereof. Specifically, we may treat the alkali carbohydrates with organic reactants to produce organic derivatives thereof. Thereafter we may again treat the compounds with an alkali reactant to substitute one or more alkali metal atoms for one or more of the other hydroxyl hydrogen atoms of the carbohydrate molecule (or units) to produce a mixed alkali organic carbohydrate. We may then react this product again with an organic reactant, different from the organic reactant previously used, to produce a mixed polyorganic carbohydrate.

For example, we may explain by reference to the drawings more in detail some of the applications of the new processes as applied to starch. If the carbohydrate is a starch, the initial product will be an alkali starchate. This alkali starchate may be treated to produce an organic starchate. The organic starchate may be again treated with an alkali reactant to produce a mixed organic alkali starchate. This mixed starchate may then be again treated with an organic reactant to produce a mixed polyorganic starchate. According to our preferred processes when applied to starch and similar polyhexoses, the first reaction will occur either on the number two carbon atom of the glucopyranose units, or on the number two and number three carbon atoms of the glucopyranose units.

Figure 4:
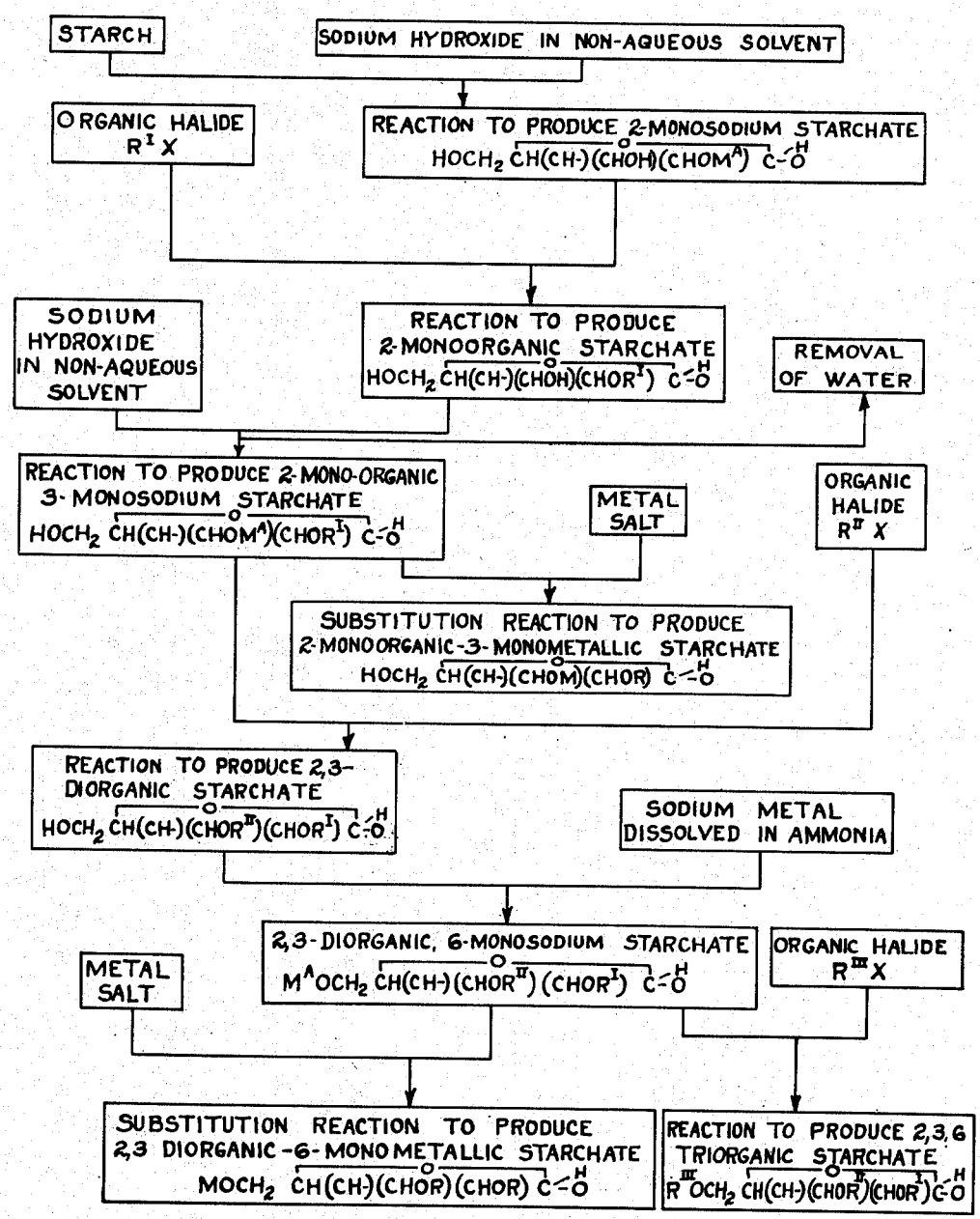
Fig. 4 is a similar diagram illustrating similar processes of producing mixed organic-metallic starchates and of producing 2-3-6 triorganic starchates.

If the first alkali reaction to a starch unit, is on the number two carbon atom only, we may then as a second step, block that position by the reaction of the alkali starchate with an organic reactant. Then as a third step, the intermediate product formed by the second step, may be reacted with an alkali reactant so as to substitute an alkali atom either on the number three carbon or on the number three and number six carbon atoms. Where the third step comprises the substitution of the alkali atom on the number three carbon atom only, the same or a different organic substituent may be substituted for the alkali atom by a fourth step. Where different organic groups have thus been substituted on the number two carbon atom and on the number three carbon atom, but the number six carbon atom has not been affected, then by fifth and sixth steps either a like organic group or an entirely different organic group may be substituted on the number six carbon atom. The reactions of the above described steps are illustrated in Fig. 4 and in Equations 1 to 6 inclusive below.

As suggested above the first and second step may effect the substitution on and the blocking of the number two carbon atom only, but the third step may alkalize both the number six and the number three carbon atoms and finally organic substituents may be substituted for the alkali at both positions six and three by a fourth step. This process is illustrated by Equations 7 to 10 inclusive below and by Fig. 5.

Figure 6:
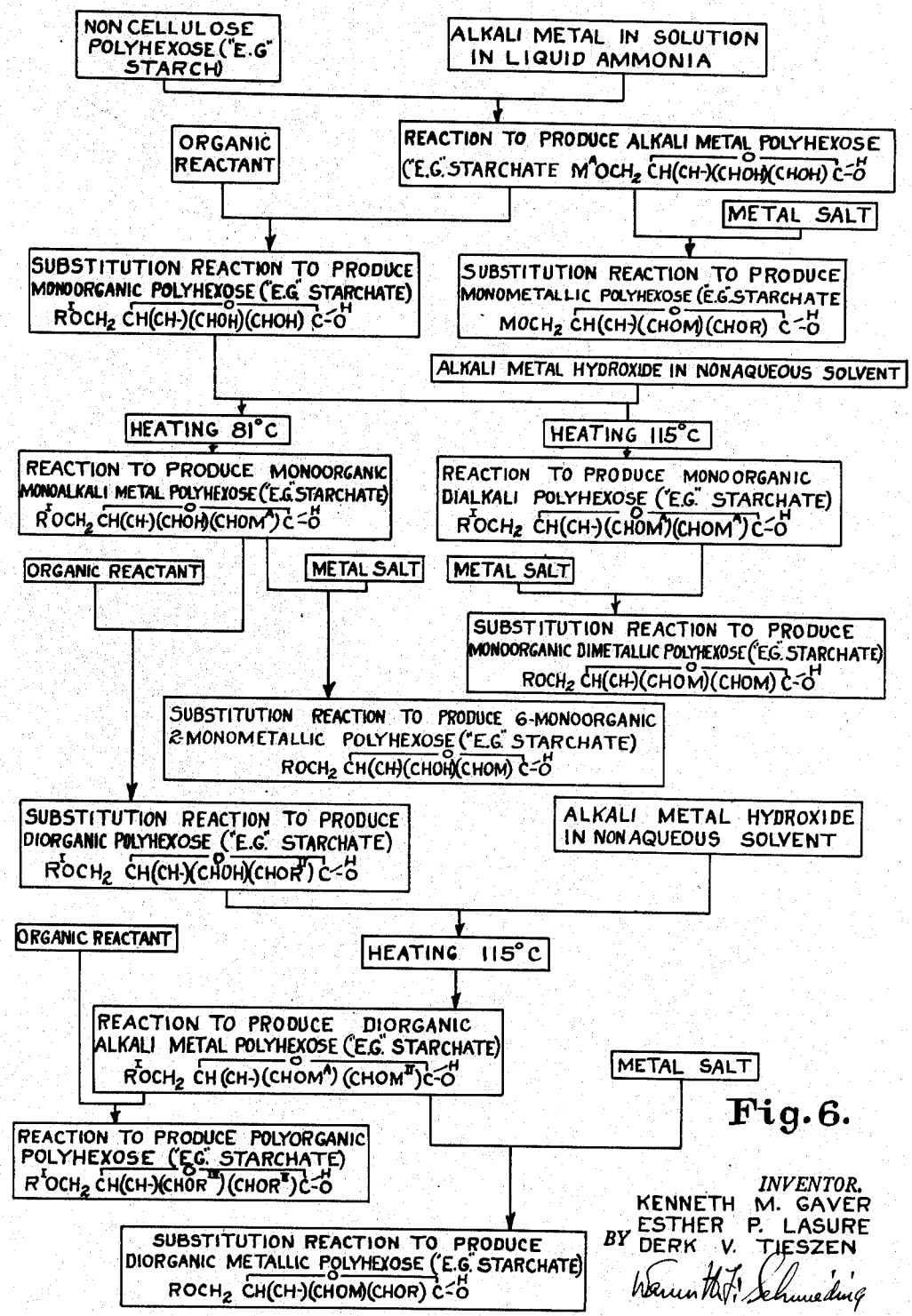
Fig. 6 is a similar diagram illustrating other processes of producing metallic-organic polyhexoses and starchates.

We may cause the initial reaction to occur on the number six carbon atom. If so, we may then block that position with an organic substituent. Then a third reaction might substitute an alkali atom or atoms on the number two carbon atom or on the number two and number three carbon atoms. Thereafter the same or a different organic group may be substituted as a fourth step in place of the alkali atom or atoms added by the third step. Then in case the number three carbon atom has not been affected, an alkali atom may be substituted on the number three carbon as a fifth step, and the same or a still different organic group may be substituted in its place as a sixth step. This process is illustrated in Fig. 6 and in Equations 11 to 16 inclusive below.

Again if as just suggested above the initial reaction is on the number six carbon atom we may then block that position with an organic substituent. Then by a third reaction we might substitute alkali atoms on both the number two and number three carbon atoms by providing for the removal of water as formed (as for example by causing the reaction to occur at about 115° C.). Finally an organic substituent which may be the same as or different from the first organic substituent can be substituted in place of the last mentioned alkali atom. This process is illustrated in Fig. 6 and in Equations 17 to 20 inclusive below.

Where it is desired that the substituent on the number three carbon atom be the same as the substituent on the number two carbon atom, the process may be shortened by performing the first reaction at a higher temperature or by utilizing other means to remove water so as to substitute alkali on both the two and the three carbon atoms at the same time. Thereafter these two positions may be blocked by the organic substituent and then the alkali may be substituted on the six carbon atom by the ammonia process and an organic substituent substituted for this alkali. This process is illustrated in Equations 21 to 24 inclusive and by Fig. 3 of the drawing.

The following equations illustrate the above enumerated process steps and show the structural formulas of the intermediate and final products where R, R' and R'' represent different organic substituents and $M^a$ represents an alkali metal substituent.

(1) $$C_6H_{10}O_5 + M^aOH \xrightarrow{81°\,C.} C_6H_9O_5M^a + H_2O$$

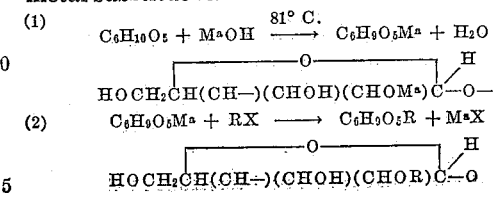

(2) $$C_6H_9O_5M^a + RX \longrightarrow C_6H_9O_5R + M^aX$$

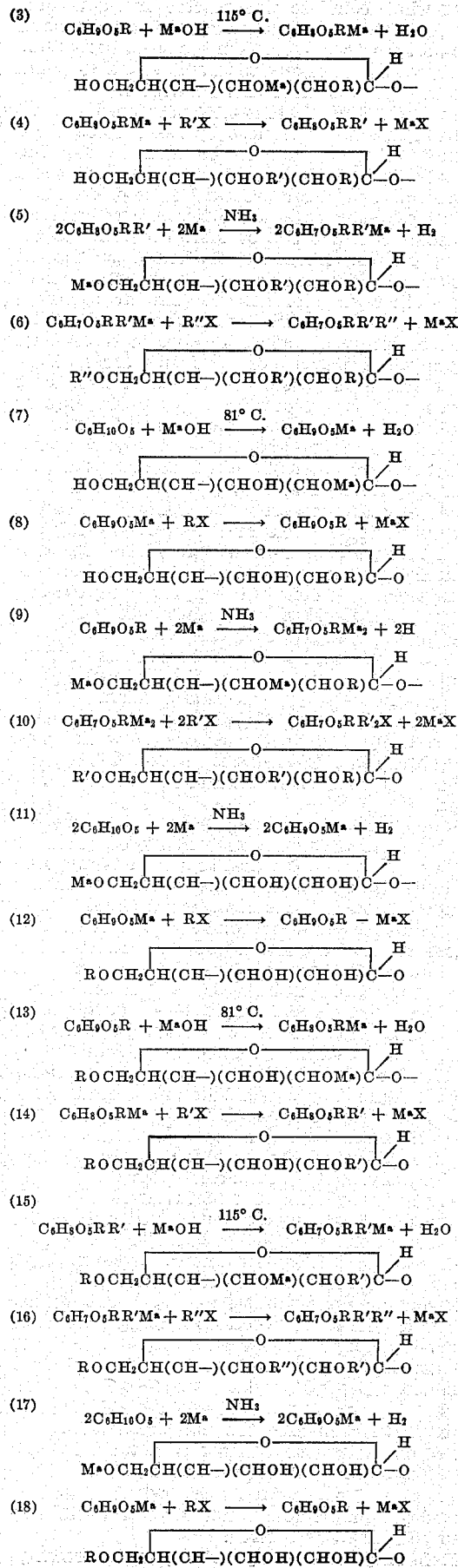
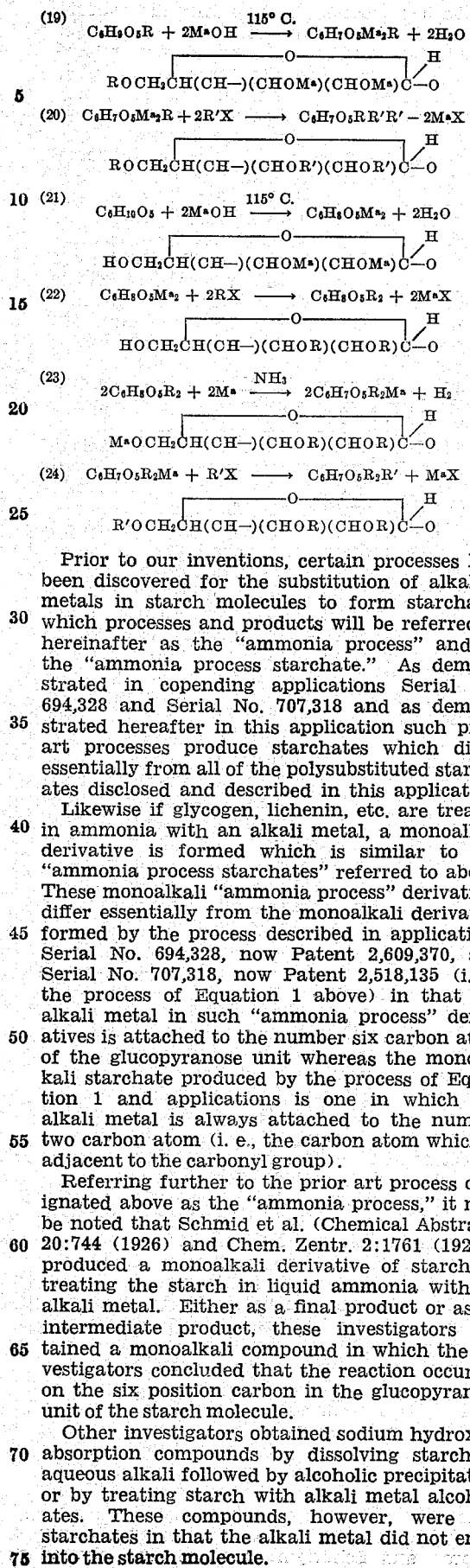

Prior to our inventions, certain processes had been discovered for the substitution of alkaline metals in starch molecules to form starchates which processes and products will be referred to hereinafter as the "ammonia process" and as the "ammonia process starchate." As demonstrated in copending applications Serial No. 694,328 and Serial No. 707,318 and as demonstrated hereafter in this application such prior art processes produce starchates which differ essentially from all of the polysubstituted starchates disclosed and described in this application.

Likewise if glycogen, lichenin, etc. are treated in ammonia with an alkali metal, a monoalkali derivative is formed which is similar to the "ammonia process starchates" referred to above. These monoalkali "ammonia process" derivatives differ essentially from the monoalkali derivative formed by the process described in applications Serial No. 694,328, now Patent 2,609,370, and Serial No. 707,318, now Patent 2,518,135 (i. e., the process of Equation 1 above) in that the alkali metal in such "ammonia process" derivatives is attached to the number six carbon atom of the glucopyranose unit whereas the monoalkali starchate produced by the process of Equation 1 and applications is one in which the alkali metal is always attached to the number two carbon atom (i. e., the carbon atom which is adjacent to the carbonyl group).

Referring further to the prior art process designated above as the "ammonia process," it may be noted that Schmid et al. (Chemical Abstracts 20:744 (1926) and Chem. Zentr. 2:1761 (1928)) produced a monoalkali derivative of starch by treating the starch in liquid ammonia with an alkali metal. Either as a final product or as an intermediate product, these investigators obtained a monoalkali compound in which the investigators concluded that the reaction occurred on the six position carbon in the glucopyranose unit of the starch molecule.

Other investigators obtained sodium hydroxide absorption compounds by dissolving starch in aqueous alkali followed by alcoholic precipitation or by treating starch with alkali metal alcoholates. These compounds, however, were not starchates in that the alkali metal did not enter into the starch molecule.

With our processes we can form disubstituted and trisubstituted starches, dextrins, glycogen, lichenin, etc. selectively. None of these selected products are possible by the prior art processes.

Also, according to prior art methods, polysubstituted products of cellulose and of simple sugars have been prepared, as, for example, as described in Scherer and Hussey, Journal American Chemical Society, 53:2344 (1931); Schorigin, Berichte 69:1713 (1936); Peterson and Barry, U. S. Patent 2,157,083 (1939); British Patent No. 463,056 (1937); Muskat, Journal of American Chemical Society, 56:693 (1934); and Muskat, Journal of American Chemical Society, 56:2449 (1934). As will be demonstrated below, these polysubstituted products of cellulose and sugar are different from the products produced by our improved process.

Heretofore as suggested above, it has been possible by known processes to form compounds in which metallic and nonmetallic elements, organic radicals and/or other groups were substituted for the hydrogen atoms of one or more of the hydroxyl groups of glucose or of similar sugars. However, it has not been possible to predetermine accurately which hydroxyl groups will be reacted to receive these substituted groups except that where there is sufficient alkali present, all hydroxyl groups could be under certain circumstances reacted. With our process we can form disubstituted sugars and cellulose, etc. selectively or we can if desired form polysubstituted sugars and cellulose selectively by new processes by which we are able if desired to predetermine diverse substituents on the various carbon atoms.

In Gaver application Serial No. 357,995, now abandoned, and the continuation thereof Serial No. 707,318, now Patent 2,518,135 and in other copending applications such as our applications Serial No. 694,328, now Patent 2,609,370 and Serial No. 781,708, now Patent 2,572,923, there are disclosed inventions relating to nonmetallic starchates (both alkali and nonalkali); to polyalkali starchates; to polymetallic starchates (nonalkali); to mono and polyorganic starchates (sometimes called starch ethers); to hydrolysis products of the various starchates; and to processes of producing such starchates and such hydrolysis products. The claims of this application will be directed to products of processes for treating carbohydrates and similar materials in order to controllably combine with such carbohydrates various and varying substituents in predetermined and controlled manner wherein there are a plurality of different substituents substituted on the various atoms or units of the compound being treated. Some of the products claimed herein are disclosed in copending application Serial No. 694,328, now Patent 2,609,370 but are not specifically claimed therein.

As suggested above, a great many workers have done extensive research in the etherfication of carbohydrates such as cellulose, starch, the sugars and other polysaccharides. Schmid (supra) and others reported that glycol, glucerine, glucose, lichenin, inulin and starch reacted readily in liquid ammonia with metallic sodium to give exclusively a monometallic derivative. However, Muskat (supra) reported that potassium in liquid ammonia reacts completely with all the available hydroxyl groups of the simple sugars and that complete alkylation of the sugars could be effected by a treatment of these metallic derivatives with an alkyl halide. Scherer and Hussey (supra) and Schorigin et al. (supra) showed that when cellulose was reacted in liquid ammonia with an alkali metal a trialkali metal cellulosate was formed. On the other hand none of these prior workers reported that they could obtain a pure monomethyl derivative.

Peterson et al. (Patent 2,157,083) disclosed the polyalkylation of cellulose by reacting cellulose with an alkali metal and subsequently alkylating the alkaline metal cellulose. Furthermore these inventors suggested a process for the preparation of mixed cellulose ethers wherein the cellulose molecule contains two or more different etherifying groups. Lilienfeld (Patent 1,350,820) in 1920 disclosed a process for the preparation of alkyl ethers of starches and similar carbohydrates by treating the carbohydrates with alkyl salts of inorganic acids or other suitable alkyl esters in the presence of basic substances. Furthermore, he suggested processes of producing mixed alkyl ethers of starch by allowing two or more inorganic acid esters or other suitable esters (differing from one another as regards the alkyl radical) to act upon the starch or its derivatives. Nichols, Jr., et al. according to Patent 2,405,973, produced starch ethers by pretreating the starch with a carboxylic acid and then etherifying the product in a substantially anhydrous reaction mixture comprising caustic alkali and the etherifying agent. In none of these prior art processes, however, have these investigators been able to obtain any control over the positions of the glucopyranose unit to which the alkyl substituent is attached. That is to say the methods of the past distribute alkyl radicals at random. In the processes to be described in detail herein hereafter, constant products can be obtained in which the alkyl radicals as desired are distributed on predetermined carbon atoms of the glucopyranose unit.

Many research chemists have worked on the methylation of starch and many of them as authors have reported that they have methylated starch by mixing starch either with (a) methyl iodide and silver oxide in water; (b) methyl sulphate and barium hydroxide; (c) methyl sulphate and sodium hydroxide; (d) alkali metal in liquid ammonia and reacting the product with an organic halide; or (e) diazomethane. On hydrolyzing the methylated starch obtained by such methods, there are found some dimethyl glucose, some trimethyl glucose and some tetramethyl glucose. In all of the prior art methods the alkyl groups are distributed indiscriminately. The distinction between the methylation of starch and the methylation of sugar (which is shown by the fact that the treatment of cane sugar with methyl iodide and silver oxide gives a trimethyl sucrose, while the methylation of starch by this method gives products which have 1.5 and 2.0 methoxyl groups per glucose unit) is an indication of this indiscriminate distribution.

On the contrary, the processes described herein controllably form mono-, di-, or trisubstituted products. In these processes if organic radicals are being substituted, the alkyl (organic) radicals are distributed as desired to form either a 2-alkyl product, a 6-alkyl product, a 2,3-alkyl product, a 2,6-alkyl product, or a 2,3,6-alkyl product wherein in each case the alkyl radicals distributed on each of the various carbon atoms may be alike or may be different as desired. Moreover, as will be shown mixed organic alkali or mixed organic nonalkali metallic starchates may also be formed as desired.

Figure 1:
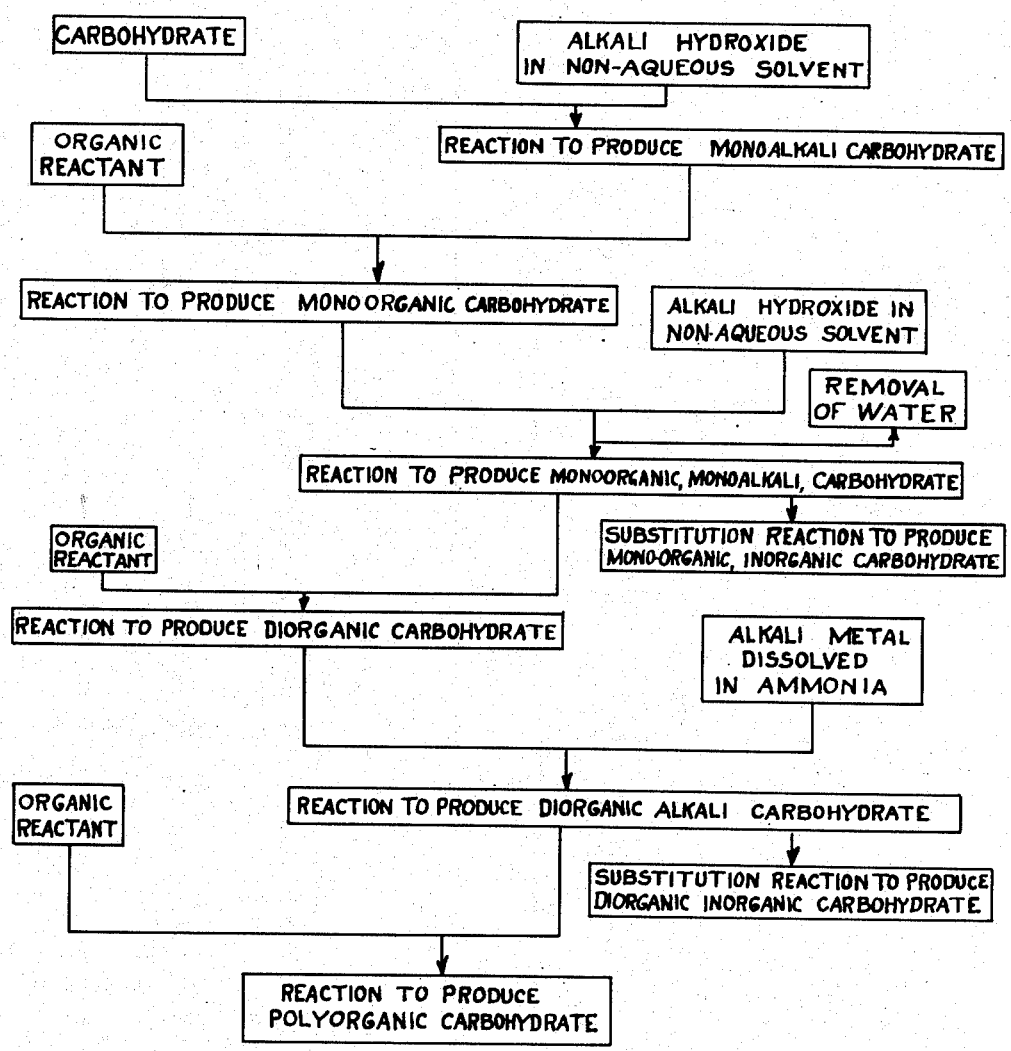
Fig. 1 is a diagram illustrating processes of forming mixed organic alkali carbohydrates and mixed polyorganic carbohydrates.

Referring now more specifically to the drawings separately, it may be seen that Fig. 1 illustrates a series of reactions to produce a polyorganic carbohydrate in which there are three organic substituents each of which differs from the others, it being understood, of course, that if desired we can make any two of these substituents the same or make all of the substituents the same. As shown by this figure, the carbohydrate is reacted with an alkali hydroxide in a nonaqueous solvent to produce a monoalkali carbohydrate which is then reacted with an organic reactant to produce a monoorganic carbohydrate. The monoorganic carbohydrate is then reacted with an alkali hydroxide in a nonaqueous solvent with provision for the removal of water to produce a monoorganic-monoalkali starchate. This is then reacted with a different organic reactant (it may be the same if desired) to produce a diorganic carbohydrate. The diorganic carbohydrate is then reacted with an alkali metal dissolved in liquid ammonia to produce a diorganic alkali carbohydrate. The diorganic-alkali carbohydrate is then reacted with a different organic reactant (it may be the same if desired) to produce a polyorganic carbohydrate in which each of the three organic substituents are, if desired, different from the others. The conditions and requirements of the reactions referred to in this and in the succeeding several paragraphs will be described in detail later in this specification after general description of the processes illustrated in Figs. 2 to 6, inclusive.

Figure 2:
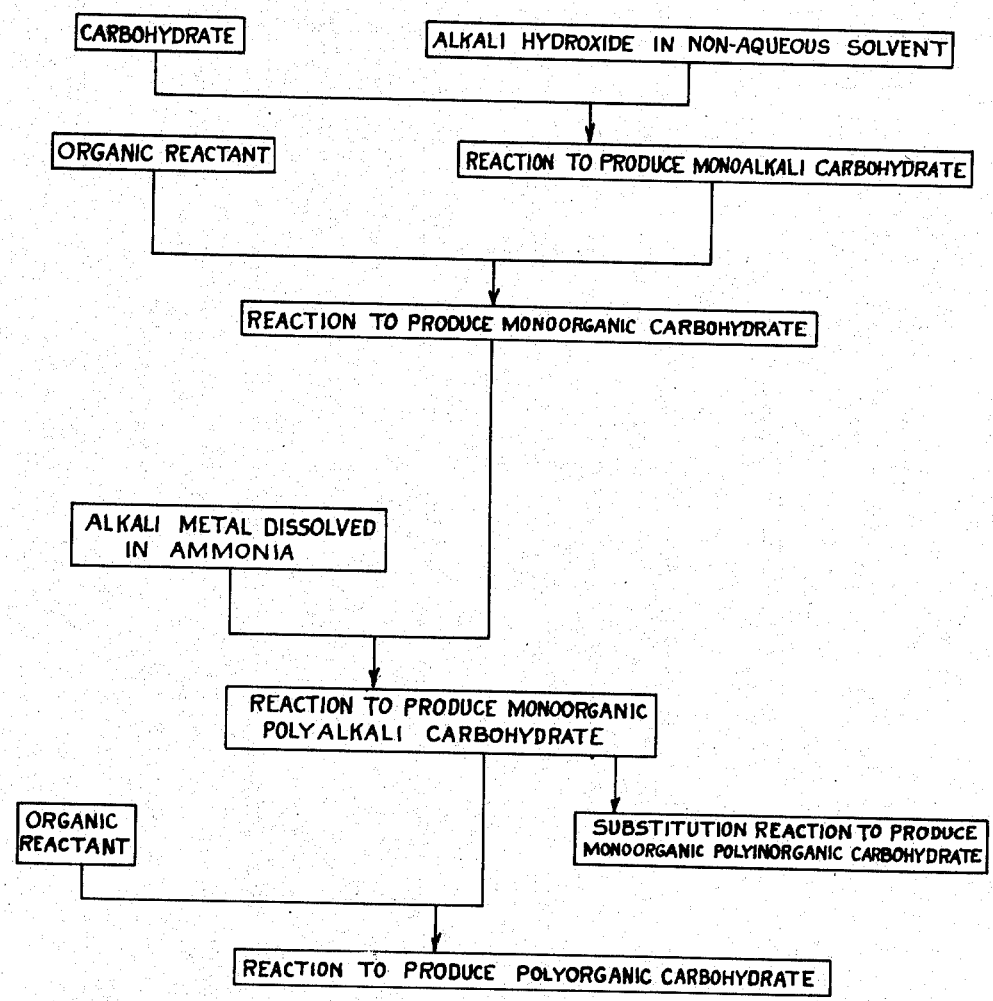
Fig. 2 is a similar diagram illustrating processes of forming different mixed organic alkali carbohydrates and illustrating processes of forming polyorganic carbohydrates by a different method.

As shown in Fig. 2, a carbohydrate is reacted with an alkali hydroxide in a nonaqueous solvent to produce a monoalkali carbohydrate. This is then reacted with an organic reactant to produce a monoorganic carbohydrate. The monoorganic carbohydrate is then reacted with alkali metal dissolved in liquid ammonia to produce a monoorganic-polyalkali carbohydrate. This monoorganic-polyalkali carbohydrate is then reacted with an organic reactant to produce a polyorganic carbohydrate. This process is shorter than the process described in connection with Fig. 1 but it will be noted that the organic groups which are substituted by the last reaction must be the same or their allocation will be indiscriminate. Thus although all of the controllable products which can be produced by the process described in connection with Fig. 2 can also be produced by the processes described in connection with Fig. 1 yet some of the products of the process of Fig. 1 (such as, for example, starchates in which the organic groups of the three and six carbon atoms differ) cannot be formed by the processes described in connection with Fig. 2.

As is also described in Figs. 1 and 2, the monoorganic mono-alkali carbohydrates, the diorganic alkali carbohydrates and the monoorganic polyalkali carbohydrates may each similarly be reacted with metal or other inorganic salts to produce respectively monoorganic monoinorganic, diorganic inorganic and monoorganic polyinorganic substituted carbohydrates.

Figure 3:
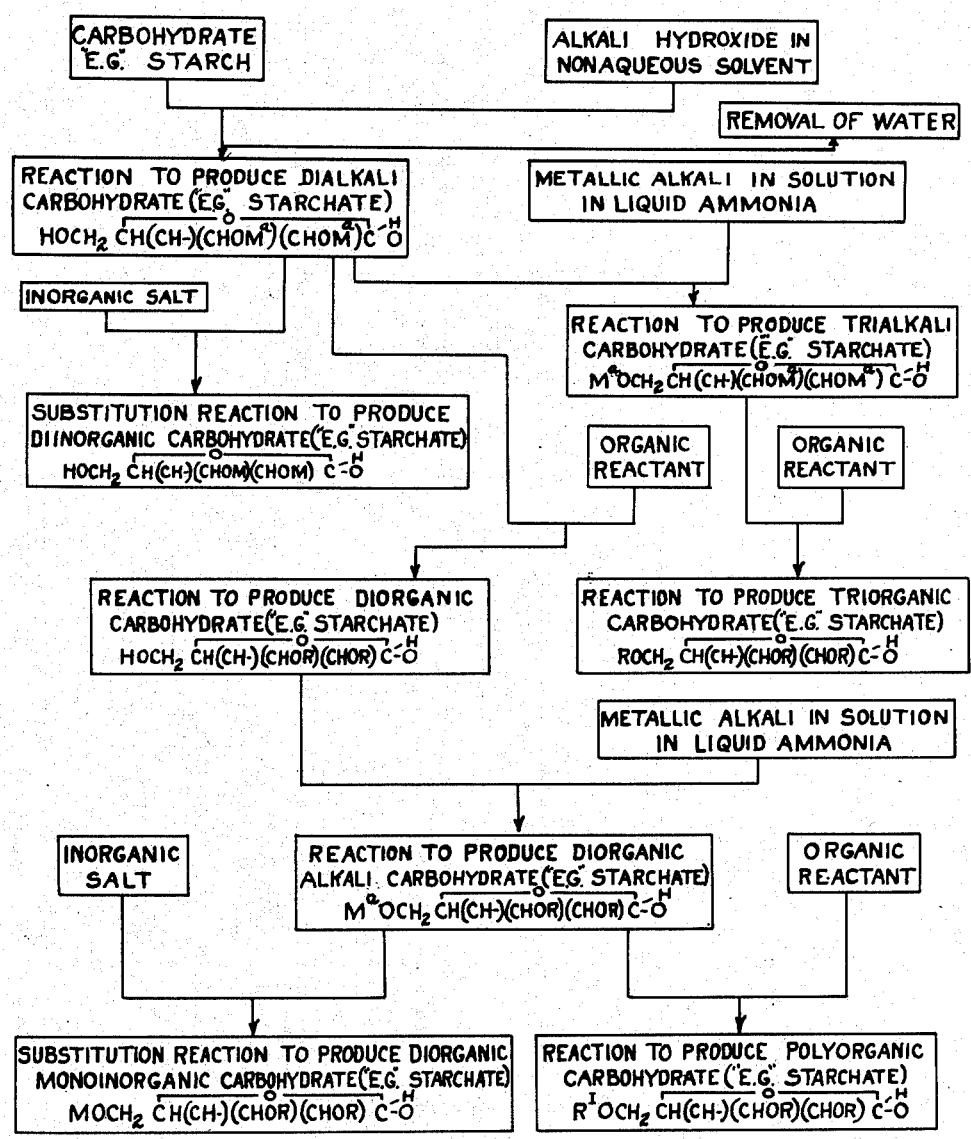
Fig. 3 is a similar diagram illustrating processes of forming different mixed organic alkali carbohydrates and diorganic carbohydrates and processes of forming polyorganic carbohydrates by a still different method.

Fig. 3 illustrates slightly different methods of producing a polyorganic carbohydrate and methods of producing diorganic-metallic carbohydrates. For example, a carbohydrate may be reacted with an alkali hydroxide in a suitable solvent to produce a dialkali carbohydrate. This may then be reacted with an organic reactant to produce a diorganic carbohydrate which may be reacted with a metallic alkali in solution in liquid ammonia to produce a diorganic-alkali carbohydrate. This last named product may then be reacted with an organic halide or other organic reactant to produce a polyorganic carbohydrate. Alternately, the dialkali carbohydrate may be reacted with metallic alkali in solution in liquid ammonia to produce a polyalkali carbohydrate which may in turn be reacted with an organic reactant to produce a polyorganic carbohydrate. It will be noted, however, that this last polyorganic carbohydrate will have all of the organic substituents alike and while such products may be produced by the process described in connection with Figs. 1 and 2 and by the process first described in connection with Fig. 3, yet polyorganic carbohydrates having constituents which differ from each other cannot be produced by the process last described. It may be noted finally that either the dialkali carbohydrate or the diorganic alkali carbohydrate may be reacted as shown with a metal or other inorganic salt to produce respectively a di-inorganic carbohydrate or a diorganic inorganic carbohydrate.

The processes illustrated in Fig. 4 apply the processes of Fig. 1 to the reaction of starch and show that starch may be reacted with an alkali hydroxide in a nonaqueous solvent to produce a monoalkali starchate and this reacted with organic reactant to produce a monoorganic starchate which then can be reacted with an alkali hydroxide in a nonaqueous solvent to produce a monoorganic-monoalkali starchate as described in connection with Fig. 1. In Fig. 4 the processes of producing a diorganic-monoalkali starchate and of producing a triorganic starchate as described in connection with Fig. 1 are also shown. However, in addition this figure shows that either the monoorganic-monoalkali starchate or other carbohydrate or the diorganic-monoalkali starchate or other carbohydrate may be reacted with a metal salt to produce in one case a monoorganic-monometallic carbohydrate and in the other a diorganic-monometallic carbohydrate.

Figure 5:
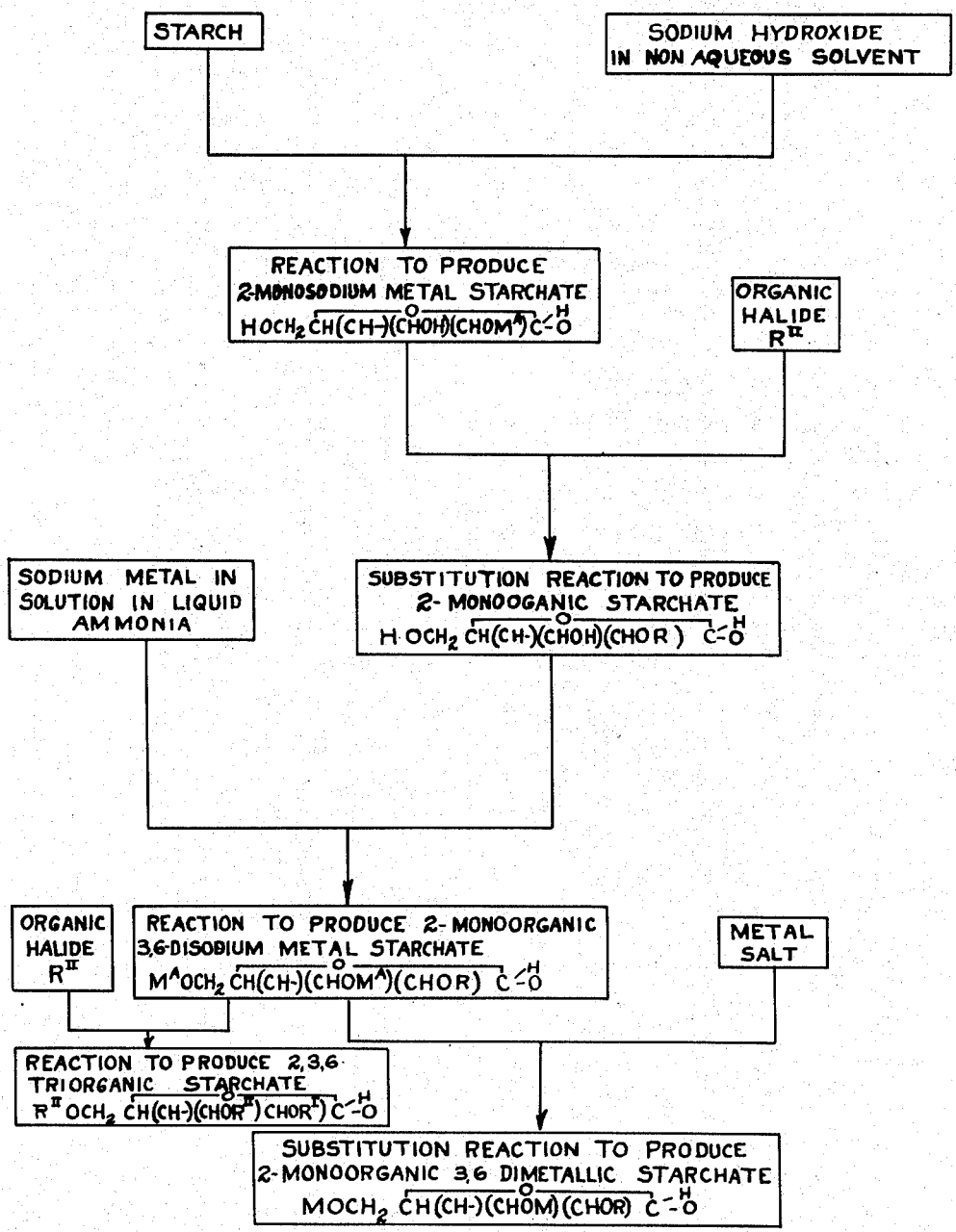
Fig. 5 is a similar diagram illustrating still other processes of producing metallic-organic starchates and of producing triorganic starchates.

Fig. 5 illustrates processes similar to Fig. 2, illustrating, however, the application of the processes specifically to the production of a 2,3,6-triorganic starchate through the application of the process to starch by the reaction thereof with sodium hydroxide, the reaction with organic halides, and the reaction with metallic sodium dissolved in liquid ammonia.

Fig. 6 illustrates similar processes of producing polyorganic carbohydrates. Therein two processes are illustrated. In both, a non-cellulose polyhexose carbohydrate is reacted with an alkali metal dissolved in ammonia to produce a monoalkali carbohydrate. This monoalkali carbohydrate is then reacted with an organic reactant to produce a monoorganic carbohydrate. In the first process illustrated this monoorganic carbohydrate is then reacted with an alkali hydroxide in a nonaqueous solvent at 81° C. to produce a monoorganic-monoalkali carbohydrate. Thereafter this monoorganic monoalkali carbohydrate is reacted with an organic reactant to produce a diorganic carbohydrate which is then reacted with an alkali hydroxide in a nonaqueous solvent at 115° C. to produce a diorganic monoalkali carbohydrate. This diorganic monoalkali carbohydrate is reacted with an organic reactant to produce a triorganic carbohydrate. The product produced by these reactions may be exactly the same as the product produced by the reaction described in connection with Fig. 1. However, the order of the steps is changed and the product is obtained by a different process. In the second process illustrated in Fig. 6 the monoorganic carbohydrate is reacted with an alkali hydroxide in sufficient quantity to substitute two atoms of alkali and with provision for removal of water as, for example, at 115° C. This produces a monoorganic dialkali carbohydrate which may be reacted with an organic reactant to produce a triorganic carbohydrate. It must be noted, however, that these last mentioned processes illustrated in Fig. 6 do not seem to be applicable in connection with sugars, cellulose and similar compounds which when reacted with alkali metal dissolved in liquid ammonia alkalate all of the available hydroxyl groups.

Now we will describe in detail the individual steps of the various processes. In Figs. 1, 2, 4 and 5, the first step disclosed involves the reaction of a starch or other carbohydrate or carbohydric substance with an alkali hydroxide in a nonaqueous solvent to produce a monoalkali starchate or carbohydrate or carbohydric substance. This step as applied to starch is described in detail in my copending applications Serial No. 694,328, now Patent 2,609,370, and Serial No. 707,318, now Patent 2,518,135 and Serial No. 781,708, now Patent 2,572,923. The reactions involved in treating other carbohydrates with an alkali hydroxide as illustrated in this step of Figs. 1 and 2 are similar to the starchate reactions fully disclosed in the above entitled applications. That is to say we have now discovered that this reaction takes place similarly whenever any carbohydrate (natural or synthetic) (or similar material having a plurality of hydroxyl groups one of which is adjacent to a carbonyl group in the building units of such carbohydrates or similar material) is treated as previously described. Whenever such carbohydrate or similar material is reacted with alkali hydroxide (such as the hydroxides of lithium, sodium, potassium, rubidium and cesium) in a nonaqueous solvent at a temperature from about 78–114° C., the hydroxyl hydrogen which is adjacent to the carbonyl group unites with the hydroxyl of the hydroxide to form water and the alkali metal becomes attached through the oxygen of the hydroxyl to the carbon atom adjacent to the carboxyl group.

In the reaction of a starch as illustrated in Figs. 4 and 5, the alkali metal atom becomes attached through the oxygen of the hydroxyl groups to the number two carbon atom to form a 2-monoalkali metal starchate (e. g. two monosodium metal starchate).

The alkaline reacting material should have an ionization constant of $2 \times 10^{-5}$ or greater in a solvent containing enough of the alkali in solution to produce a solution at a temperature of about 80° C. corresponding to about an 0.04N solution of sodium hydroxide. This reaction is the same when using waxy rice, yucca, sago, arrowroot, sweet potato, potato, corn, wheat, tapioca and amioca starches; a series of thin boiling starches; wheat, potato, tapioca and corn dextrins; dextran; cotton, linen, jute, ramie and other cellulose material; sucrose; inulin; and gum and other mixed hexosans, pentosans, etc. Reducing sugars react similarly to produce syrups which analyze to be monoalkali derivatives but which have not yet been finally characterized. However, from all data so far collected, it seems certain to us that with such sugars, the alkali metal reacts on the carbon atom adjacent to the carbonyl group.

It has been found that any nonaqueous solvent which will dissolve the alkali hydroxide even in small amounts is a suitable vehicle in which to carry out the reaction although all solvents may not have the same utility in the process. Following is a list of some eighty solvents which we have found suitable in this process:

ALCOHOLS USABLE

Allyl
Iso-amyl
n-Amyl
Sec.-amyl
Tert.-amyl
Anisyl
Benzhydrol
Benzoyl carbinol
Benzyl
2,3-butanediol
n-Butyl
Iso-butyl
Sec.-butyl
Tert.-butyl
Sec. butyl carbinol
β(p-Tert. butyl phenoxy) ethyl
Capryl
Ceryl
Cetyl
3-chloro-2 propanol-1
Cinnamic
Crotyl
Cyclohexanol
Decyl
Diacetone
Diethyl carbinol
Dimethyl benzyl carbinol
Dimethyl ethynyl carbinol
Dimethyl n-propyl carbinol
Dimethyl isopropyl carbinol
Di-n-propyl carbinol
Di-iso-propyl carbinol
Ethyl
2-ethyl butyl
2-ethyl hexanol
Furfuryl
n-Heptyl
n-Hexyl
Sec.-hexyl
Lauryl
Methallyl
Methyl
Methyl amyl
Methyl butyl carbinol
o-Methyl cyclohexanol
m-Methyl cyclohexanol
p-Methyl cyclohexanol
2-methyl pentanol-1
Methyl isopropyl carbinol
n-Nonyl
n-Octyl
Octanol-2
Phenyl-propyl
n-Propyl
Iso-propyl
Tetrahydrofurfuryl
Triethyl carbinol
Triphenyl carbinol

VARIOUS POLYHYDRIC ALCOHOLS USABLE

Ethylene glycol
Ethylene glycol monomethyl ether
Ethylene glycol monoethyl ether
Ethylene glycol monobenzyl ether
Ethylene glycol monobutyl ether
Diethylene glycol
Diethylene glycol monomethyl ether
Diethylene glycol monoethyl ether
Diethylene glycol monobenzyl ether
Diethylene glycol monobutyl ether
Di-propylene glycol
Glycerol
Glycerol α-n-butyl ether
Glycerol α,γ'-dimethyl ether
Glycerol α,γ-diphenyl ether
Glycerol α-monomethyl ether
Hexamethylene glycol
2-methyl 2,4-pentanediol
Propylene glycol
Triethylene glycol
Trimethylene glycol As step two of the processes illustrated in Figs. 1, 2, 4 and 5, the monoalkali carbohydrate (e. g. monosodium starchate) is reacted with an organic reactant (e. g. organic halide) to produce a monoorganic carbohydrate (e. g. 2-monoorganic starchate). To accomplish this step we treat the monoalkali carbohydrate with an etherifying agent. We may suspend the carbohydrate in from one to ten times the calculated quantity of an etherifying agent and heat (with pressure if desired) to 80–81° C. or higher (e. g. to 92° C.) for from two to twenty-four hours. By this step we obtain a monoorganic carbohydrate which, when the reaction is with the 2-monoalkali starchate, produces a 2-monoorganic starchate having a formula of

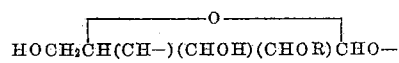

A dispersing solvent may be used as desired but is unnecessary. The reactants may be agitated or not as desired. Pressure may be applied or not as desired. The monoalkali carbohydrate may be treated with the organic compound in other ways than as above specified if desired. In many of our experiments we used organic halides, but any organic compound containing a replaceable halogen or similarly reacting group is satisfactory. For instance, dimethyl sulfate, amyl nitrate, nitroparaffins, organic phosphate, acetates, benzoates, etc. are satisfactory. As further examples of the reactants which will react with the monoalkali metal or metallic carbohydrates to produce the corresponding monoethers of such carbohydrates the following may be mentioned.

Acetodichlorohydrin
Allyl bromide
Allyl chloride
Allyl iodide
n-Amyl bromide
Iso-amyl bromide
Iso-amyl chloride
Tert.-amyl chloride
Amylene dichloride
Iso-amyl iodide
Benzalacetophenone dibromide
Benzal chloride
Benzotrichloride
Benzyl bromide
Benzyl chloride
Bromoacetic acid
ω-Bromaceto-β-naphthone
α-Bromo-n-butyric acid
2-bromo-1-chloropropane
Bromocyclohexane
β-Bromoethyl ether
β-Bromoethyl phenyl ether
Bromoform
2-bromo-n-octane
p-Bromophenacyl bromide
Bromopicrin
α-Bromopropionic acid
β-Bromopropionic acid
γ-Bromopropyl phenyl ether
α-Bromo-n-valeric acid
α-Bromo-iso-valeric acid
γ-Butyl bromide
Iso-butyl bromide
Sec.-butyl bromide
Tert.-butyl bromide n-Butyl chloride
Iso-butyl chloride
Sec.-butyl chloride
Tert.-butyl chloride
n-Butyl chloroacetate
Iso-butyl chlorocarbonate
α-Butylene bromide
β-Butylene bromide
Iso-butylene bromide
n-Butylidene chloride
n-Butyl iodide
Iso-butyl iodide
Sec.-butyl iodide
Tert.-butyl iodide
Cetyl bromide
Cetyl iodide
Chloral
Chloroacetamide
Chloroacetodiethylamide
Chloroacetic acid
Chloroacetone
Chloroacetonitrile
Chlorobutane
β-Chlorobutyric acid
γ-Chlorobutyronitrile
Cholorcyclohexane
β-Chloroethyl acetate
β-Chlomethyl chlorocarbonate
Chloroform
Chloropicrin
α-Chloropropionic acid
β-Chloropropionic acid
β-Chloropropionitrile
γ-Chloropropyl chlorocarbonate
Decamethylene bromide α,β-Dibromobutyric acid
2,3-dibromopropene
α,β-Dibromopropionic acid
β,γ-Dibromopropyl alcohol
3,5-dibromopyridine
α,β-Dibromosuccinic acid
Dichloroacetic acid
γ,γ'-Dichloropropyl ether
β,β'-Dichloroisopropyl ether
Epibromohydrin
Epichlorohydrin
Ethyl bromide
Ethyl bromoacetate
Ethyl α-bromo-n-butyrate
Ethyl α-bromo-n-caproate
Ethyl bromomalonate
Ethyl α-bromopropionate
Ethyl β-bromopropionate
Ethyl α-bromo-isovalerate
Ethyl chloride
Ethyl chloroacetate
Ethyl α-chloroacetoacetate
Ethyl chlorocarbonate
Ethyl β-chloropropionate
Ethyl dibromoacetate
Ethyl dibromomalonate
Ethyl dichloroacetate
Ethylene bromohydrin
Ethylene bromide
Ethylene chloride
Ethylene chlorobromide
Ethylene chlorohydrin
Ethylidene bromide
Ethylidene chloride
Ethyl iodide Ethyl trichloroacetate
Glycerol α,γ-dibromohydrin
Glycerol α,γ-dichlorohydrin
Glycerol α,β-dichlorohydrin
Glycerol α-monochlorohydrin
n-Heptyl bromide
n-Heptyl iodide
Hexachloroethane
Hexamethylene bromide
n-Hexyl bromide
n-Hexyl chlorocarbonate
n-Hexyl iodide
Iodoacetic acid
Iodoform
Lauryl bromide
Lauryl chloride
Methyl bromide
Methyl bromoacetate
Methyl β-bromopropionate
Methyl chloroacetate
Methyl chlorocarbonate
Methyl chloroform
Methyl α,β-dibromopropionate
Methyl α,β-dichloropropionate
Methylene bromide
Methylene chloride
Methylene iodide
Myristyl bromide
Methyl iodide
n-Nonyl bromide
n-Octadecyl bromide
n-Octadecyl chloride
Phenacyl bromide
Phenacyl chloride
n-Propyl bromide Isopropyl bromide
n-Propyl chloride
Isopropyl chloride
Propylene bromide
Propylene bromohydrin
Propylene chloride
Propylene chlorobromide
Propylene chlorohydrin
s-Tetrabromoethane
s-Tetrachloroethane
Tetrachloroethylene
1,1,2-tribromoethane
Tribromoethylene
1,2,3-tribromo-2-methyl propane
1,2,3-tribromopropane
Trichloroacetic acid Trichloro-tert.-butyl alcohol
2,2,3-trichlorobutyric acid
1,1,2-trichloroethane
Trichloroethylene
1,2,3-trichloropropane
Triglycol dichloride
Trimethylene bromide
Trimethylene bromohydrin
Trimethylene chloride
Trimethylene chlorobromide
Trimethylene chlorohydrin
Triphenylchloromethane
o-Xylyl bromide
m-Xylyl bromide
p-Xylyl bromide
o-Xylylene bromide
o-Xylylene chloride and similarly reacting chemicals including especially the esters.

The alkali carbohydrate may if desired be dispersed with the organic reactant in any suitable solvent. In addition to the solvents mentioned above as solvents for the alkali hydroxides, the following dispersing solvents may also be used:

Sec.-amyl benzene
Tert.-amyl benzene
Benzene
n-Butyl benzene
Sec.-butyl benzene
Tert.-butyl benzene
Cumene
Cyclohexane
2,7-dimethyl octane
Ethyl cyclohexane
Heptane
Hexane
Hexadecane
Ligroin
Methyl cyclohexane
Nonane n-Octane
Iso-Octane
n-Pentane
Petroleum ether
Propyl benzene
Tetraisobutylene
Tetradecane
Toluene
Tri-isobutylene
Trimethyl butane
Trimethylethylene
2,2,4-trimethyl pentane
Triphenyl methane
o-Xylene
m-Xylene
p-Xylene and various others.
The following ketones may also be used:

Acetone
Acetophenone
Anisolacetone
Benzalacetone
Benzoylacetone
Diethyl
Diisopropyl
Ethyl phenyl
Ethyl undecyl Methyl amyl
Methyl butyl
o-Methyl cyclohexanone
m-Methyl cyclohexanone
Methyl ethyl
Methyl hexyl
Methyl n-propyl
Methyl iso-propyl and various others.
The following ethers may also be used:

Allyl
Allyl ethyl
n-Amyl
Iso-amyl
Anethole
Anisole
Benzyl
Benzylmethyl
n-Butyl benzyl
n-Butyl
n-Butyl phenyl
1,4-dioxane
Di-n-propyl Benzyl ethyl
Cholormethyl
Dichloromethyl
Diethylene glycol diethyl
Ethyl butyl
Ethylene glycol dibenzyl
Ethylene glycol diethyl
Ethyl
Phenetole
n-Hexyl
n-Propyl
Iso-propyl and various others.
By these various lists we do not mean to exclude any other dispersing solvents.

As indicated in Figs. 1 and 4, we have discovered that if we react the monoorganic carbohydrate resulting from the reactions of steps 2 of those figures with an alkali hydroxide in a nonaqueous solvent in the same manner as in the first step of these figures with the difference that the temperature is raised to 115° C. or higher so that water formed by the reaction is removed by boiling or if other suitable provision is made for the removal of water, the process produces a monoorganic monoalkali carbohydrate. In the case of starch, this step produces a 2-monoorganic, 3-monoalkali starchate having a formula of

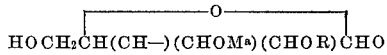

HOCH₂CH(CH—)(CHOMa)(CHOR)CHO

The same solvents as are used in step 1 are suitable; the same alkali hydroxides are suitable. The alkaline reacting material should have an ionization constant of $2 \times 10^{-5}$ or greater in a solvent containing enough of the alkali in solution to produce an alkaline solution corresponding to a sodium hydroxide solution at a temperature of 115° C. There may be agitation or not as desired. The reaction should continue for a period of one hour or longer. There must, however, be provision for removal of water formed in the reaction. This is most important and the stricter requirements for the removal of water together with the higher temperature distinguish the requirements of this step from the requirements of step 1. It is essential as stated that the water evolved in the reaction be removed as rapidly as formed. Therefore only those solvents boiling at 115° C. or more appear now to have any utility as solvents in the reaction except in special cases where some other means have been devised to remove the water. At 115° C. the water is removed by boiling or distillation. At temperatures below 115° C. special means must be provided for removing the water.

The fourth step illustrated in Figs. 1 and 4 is similar to the second step thereof. It comprises the reaction of the product of the third step with an organic reactant. This may be the same organic reactant as is used in connection with the second step or it may be a different organic reactant. It may be any of the organic halides or similar reactants mentioned above in connection with step 2. Where the initial carbohydrate is a starch as is illustrated in Fig. 4, during the treatment illustrated in the fourth step, there is a reaction to produce a 2,3-diorganic starchate having a formula of

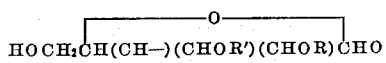

In this step as in the preceding step the temperature should be kept at 115° C. or higher and precaution should be taken to prevent water contamination.

The first step of the process disclosed in Fig. 3 is slightly different. If, as indicated in Fig. 3 the carbohydrate is initially reacted with a similar alkali hydroxide in a nonaqueous solvent under the conditions described in the last paragraph, that is, at a temperature of 115° C. or with special provisions for the removal of water, a dialkali carbohydrate is produced as the first step in the process. However, with such modified process step, the organic radicals which are substituted preferably should be alike. If two different organic radicals are substituted, the substitution will be indiscriminate.

The second step of the process illustrated in Fig. 3 is similar to the second and fourth steps of Figs. 1 and 4 as described above with the difference that sufficient organic reactant must be supplied to allow two moles thereof to react with each unit of the carbohydrate. Thereby a diorganic carbohydrate is produced. It may be noted that this diorganic carbohydrate may also be produced by the longer process disclosed in Fig. 1 (Fig. 4 where starch is reacted). However, both organic substituents will preferably in the process disclosed in Fig. 3, be the same whereas in the processes disclosed in Figs. 1 and 4 the organic substituents may, if desired, be different, and the position of such different substituents may be controlled. Thus while all of the preferred products which may be produced by the process disclosed in Fig. 3, may be produced by the process disclosed in Fig. 1 (or Fig. 4) yet the process disclosed in Fig. 3 will not produce all of the products which may be produced by the process disclosed in Fig. 1 (or Fig. 4).

The fifth main step of the processes disclosed in Figs. 1 and 4 and the third main step of the processes disclosed in Fig. 3, comprise the reaction of the product of the preceding step with an alkali metal dissolved in liquid ammonia. As pointed out above this step is a step known in the prior art. However, we combine this step with the previous steps of these processes and the combinations become new processes because they involve new combinations of steps some of which are old and some of which are new. Moreover, entirely new products are obtained by these reactions. For example by these reactions (in the case of starch), we can produce a 2,3-diorganic-6-monoalkali starchate having a formula of

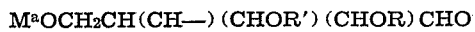

The sixth main step of the process disclosed in Fig. 1 and in Fig. 4 is similar to the second and fourth steps of those processes. The fourth step of the process illustrated in Fig. 3 is also similar. In these steps we react the product of the preceding steps with an organic reactant. This reactant may be the same as used in the preceding step 2 of Figs. 1 and 4 or it may be the same as used in the preceding step 2 of Fig. 3, or it may be entirely different from the reactants used in those steps. In the case of starch, we produce by this reaction a 2,3,6-triorganic starchate having a formula of

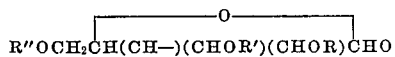

The processes illustrated in Fig. 2 and Fig. 5 are in some respects similar to those illustrated in Fig. 1. However, the order of the steps of the processes disclosed in Figs. 2 and 5 are different from the order of the steps disclosed in Fig. 1 so that some new and different products may be obtained. Also while some of the products obtained by the processes disclosed in Fig. 2 may be the same as the products obtained by the process of Fig. 1, still there are disclosed new processes for producing these same new compounds. As in the process described in connection with Fig. 1, the first step of the process illustrated in Fig. 2 is the reaction of the carbohydrate with an alkali hydroxide dissolved in a nonaqueous solvent to produce a monoalkali carbohydrate. This is exactly the same step as described in connection with the process illustrated in Fig. 1. Moreover, the second step is also exactly the same and comprises the reaction of the monoalkali carbohydrate with an organic reactant to produce a monoorganic carbohydrate. The third step of the process illustrated in Fig. 2 comprises the reaction of this monoorganic carbohydrate with an alkali metal dissolved in ammonia to produce a monoorganic dialkali carbohydrate. Where starch is the carbohydrate used, the initial reaction produces (as is indicated in Fig. 5) a 2-monoalkali metal starchate having a formula of

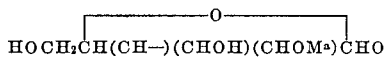

By the second step thereof a 2-monoorganic starchate having a formula of

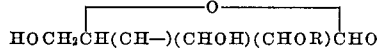

is produced. When this monoorganic starchate is reacted with an alkali metal dissolved in ammonia, it produces a 2-monoorganic-3,6-dialkali starchate having a formula of

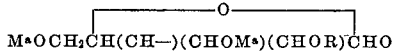

It will be noticed that this step three of the process disclosed in Figs. 2 and 5 is similar to step five disclosed in Fig. 1. The result however is that the alkali metal is attached in place of all of the hydrogens of all of the free hydroxyl groups of the carbohydrate. In the case of starch, the alkali metal is attached to both the number three carbon atom and the number six carbon atom with the result that the product of step 3 is entirely different from the product of either step 3 or step 5 of the process described in connection with Figs. 1 and 4.

Step four of the reaction disclosed in Figs. 2 and 5 is similar to step two of the processes disclosed in those figures. That is to say the preceding product is reacted with an organic reactant to produce a polyorganic carbohydrate (a triorganic starchate in case starch is the initial compound). Thus steps two and four of the processes illustrated in Figs. 2 and 5 is the same step as steps 2, 4, and 6 of Fig. 1 as is fully described above in connection with the showings in Figs. 1 and 4 and is carried out in the same way and with the same precautions. In the case of starch being the initial compound, the final product of step four (as is illustrated in Fig. 5) is a 2,3,6-triorganic starchate having a formula of

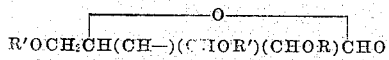
R'OCH₂CH(CH—)(CHOR')(CHOR)CHO

Although the designation of the organic radicals in the formula of this 2,3,6-triorganic starchate as shown in Fig. 5 differs from the designation of the corresponding substituents of the 2,3,6-triorganic starchate produced by the first six steps of the process shown in Fig. 4 as is disclosed by comparison of the formulas, yet the product produced may be exactly the same, depending upon the choice of the organic reactant for reaction in steps two, four and six of the process described in connection with Fig. 4 and of the organic reactant for reaction in steps two and four of the processes described in connection with Fig. 6. Thus the products produced by the process of Fig. 2 may be produced by the process disclosed in Fig. 1 although the process differs because of the different order of steps. However, because in the process described in connection with Fig. 1, different organic groups may be substituted by the fourth and sixth reactions, a greater number of different organic starchates may be synthesized thereby than by the process described in connection with Fig. 2.

We also disclose (in connection with Figs. 1, 2, 3, 4 and 5) mixed organic-metallic (or other inorganic) carbohydrates which may be produced according to our processes. For instance, we may react the 2-monoalkali starchates with a metallic salt or nonmetallic reactant to produce a 2-monometallic starchate, it being understood that in the formulas shown in the figures that Mᵃ is used to indicate an alkali metal and M is used to indicate a nonalkali metal atom or group or nonmetallic atom or group. Such a 2-monometallic starchate may be represented by the formula

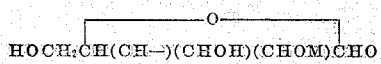
HOCH₂CH(CH—)(CHOH)(CHOM)CHO

Furthermore the 2-monoorganic 3-6 dialkali starchate disclosed in Fig. 5 may be reacted with a metal salt to produce a 2-monoorganic 3,6-dimetallic starchate having a formula of

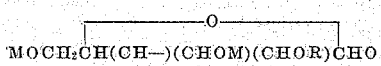
MOCH₂CH(CH—)(CHOM)(CHOR)CHO

Again the 2-monoorganic 3-monoalkali starchates shown in Fig. 4 may be reacted with a metal salt to produce a 2-monoorganic-3-monometallic starchate. Also the 2-3 diorganic 6-monoalkali starchate shown in Fig. 4 may be reacted with a metal salt to produce a 2-3 diorganic 6-monometallic starchate. Similarly the monoorganic monoalkali carbohydrates, the monoorganic dialkali carbohydrates and the diorganic monoalkali carbohydrates shown in Figs. 1, 2 and 3 may be reacted with inorganic nonmetallic salts to produce monoorganic monoinorganic, diorganic monoinorganic and monoorganic diinorganic carbohydrates.

In the processes illustrated in Fig. 6, the first step differs from the first step of the processes disclosed in Figs. 1 to 5, inclusive. Although certain of the same end products may be produced either by the processes disclosed in Fig. 6 or by the processes disclosed in Figs. 1 to 5, inclusive, the processes themselves are different, some intermediate products are different and some alternative processes produce some different products. The processes of Fig. 6 by reason of the change in the initial step are obviously different from the processes described in connection with Figs. 1 to 5, inclusive. In the main process disclosed in Fig. 6, a carbohydrate (noncellulose polyhexose) is reacted with an alkaline metal dissolved in liquid ammonia to produce a monoalkali carbohydrate which in the case of starch has a formula of

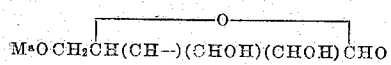
MᵃOCH₂CH(CH—)(CHOH)(CHOH)CHO

This monoalkali carbohydrate is then reacted (as previously described) with an organic reactant to produce a monoorganic carbohydrate differing from the monoorganic carbohydrates previously described in connection with Figs. 1 to 5, inclusive, but similar in some cases to some of the products of some of the prior art processes. In case starch is the initial compound the product is a 6-monoorganic starchate having a formula of

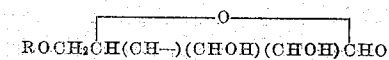
ROCH₂CH(CH—)(CHOH)(CHOH)CHO

It may be noted that this 6-monoorganic starchate differs from the 2-monoorganic starchate produced by the processes disclosed in Figs. 4 and 5. The other monoalkali carbohydrates produced by the processes disclosed in Figs. 1 and 2 will also differ from the monoalkali carbohydrates produced by the process disclosed in Fig. 6. The monoorganic carbohydrate produced by the process disclosed in Fig. 6 is subsequently reacted with an alkali hydroxide in a nonaqueous solvent in the manner previously described in connection with the reactions of the processes of Figs. 1, 2, 4 and 5. This reaction may produce a monoorganic monoalkali carbohydrate. In case the initial compound is a starch it may produce a 6-monoorganic 2-monoalkali starchate having a formula of

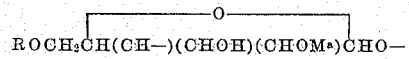
ROCH₂CH(CH—)(CHOH)(CHOMᵃ)CHO—

The monoorganic monoalkali carbohydrate is in each case reacted with an organic reactant to produce a diorganic carbohydrate which in the case of a reaction of a starchate produces a 2,6-diorganic starchate having the formula of

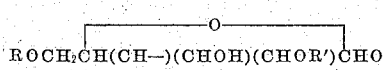
ROCH₂CH(CH—)(CHOH)(CHOR')CHO

This diorganic starchate is then reacted with an alkali hydroxide in a nonaqueous solvent with provision for the removal of water and with adequate precautions against water contamination. The temperature must be raised to 115° C. or higher so that water is driven off by distillation or other provision must be made for the removal of water. This produces a diorganic monoalkali carbohydrate. In the case of the reaction of a starchate the product is a 2,6-diorganic, 3-monoalkali starchate having a formula of ROCH$_2$CH(CH—)(CHOM$^a$)(CHOR')CHO By reaction with an organic reactant as in the processes previously described a triorganic carbohydrate may be produced. In the case of a starchate the product is a 2-3-6-triorganic starchate having a formula of

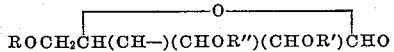

ROCH$_2$CH(CH—)(CHOR")(CHOR')CHO

Although this formula may appear different from that of the products produced by the previously described processes, yet it may define exactly the same products which may thus be produced by such different process. Also as indicated in the drawing of Fig. 6 the monoorganic monoalkali carbohydrate thereof may be reacted with an inorganic salt (as for example a metal salt) to produce a monoorganic monoinorganic carbohydrate and the diorganic monoalkali carbohydrate shown therein may also be reacted with an inorganic salt (such as for example a metal salt) to produce a diorganic monoinorganic carbohydrate.

Alternatively the third step may include a heating to about 115° C. with a sufficient quantity of alkali hydroxide so that a monoorganic dialkali carbohydrate is produced. This may then be reacted to produce a polyorganic carbohydrate in which all of the substituents except the first are preferably the same. In the case of starch this will produce a 2-3-6-triorganic starchate having a formula of

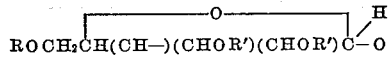

ROCH$_2$CH(CH—)(CHOR')(CHOR')C—O

The monoorganic dialkali carbohydrate may be reacted with an inorganic salt (such as, for example, a metal salt) to product a monoorganic di-inorganic carbohydrate.

Many of the inorganic carbohydrates (as, for example, especially the metallic starchates) may be further reacted to replace the inorganic substituent by a different positive monovalent radical including radicals derived from complex inorganic salts and organic esters, ion groups of multiple valent derivatives.

Variations of the above methods include their use in combination with certain old processes. For instance, after obtaining a 2-organic starchate, a 2,3-organic starchate, a 2,6-organic starchate all the remaining free hydroxyl groups may be reacted (1) by any convenient etherifying method or (2) by any other means to form derivatives of the free hydroxyls.

The following examples illustrate the application of the processes of our invention to produce polyorganic carbohydrates and illustrate a few of the products which may be synthesized by the processes of our invention.

*Example I.—Preparation of 2-ethyl, 3-n-propyl, 6-n-butyl starchate*

In a 1000 ml. three-necked flask fitted with an efficient agitator, a thermometer and a reflux condenser, the following is placed:

100 grams of starch
22 grams of sodium hydroxide
500 ml. butanol

This mixture is heated to 85° C. for two hours with vigorous agitation. We filter on suction, wash with butanol and then with toluene. The products at this stage are a 2-sodium starchate and water in solution and if desired can be used directly. The starchate product was however, dried to separate the 2-sodium starchate. The 2-sodium starchate must be protected from moisture and carbon dioxide during filtration, processing and drying. Drying was effected in a vacuum at temperatures below 100° C.

The sodium starchate so prepared is suspended with ethyl bromide in anhydrous toluene according to the following proportions:

100 grams of the sodium starchate
200 ml. toluene
100 ml. of ethyl bromide

This mixture is placed in a 1000 ml. bomb (glass lined), sealed tight and autoclaved at 100° C. for about four hours.

The supernatant liquid is filtered off and the product repeatedly extracted hot with anhydrous butanol to remove the sodium bromide formed. This purified product which is an ethyl starchate is washed with anhydrous toluene and then dried.

In a 1000 ml. Claissen flask fitted with an efficient agitator and a thermometer the following are placed:

100 grams of ethyl starchate
20 grams of sodium hydroxide
750 ml. butanol

We slowly distill with vigorous agitation until the distillation temperature ceases to rise (or when the temperature reaches 118° C.). We filter hot with elaborate precautions to avoid contamination by moisture and wash twice with anhydrous butanol then with anhydrous toluene.

The product at this stage is a 2-ethyl, 3-sodium starchate and can be used directly. (The dry product is unstable.)

The ethyl sodium starchate prepared as above is suspended with n-propyl bromide in anhydrous toluene according to the following proportions:

100 grams of ethyl sodium starchate
200 ml. toluene
100 ml. of n-propyl bromide

This mixture is placed in a 1000 ml. bomb (glass lined), sealed tight and autoclaved at 100° C. for about four hours.

The supernatant liquid is decanted (or filtered) off and the product repeatedly extracted hot with anhydrous butanol to remove the sodium bromide formed. This purified product is a 2-ethyl, 3-n-propyl starchate and is then washed with anhydrous toluene and then dried.

A 1000 ml. three-necked flask fitted with an efficient agitator, an ammonia inlet and a vent, and immersed two inches in a dry ice-acetone bath, is used.

Dry ammonia gas is passed into the flask until 500 ml. of liquid ammonia have been condensed. Twenty-five grams of dry 2-ethyl, 3-n-propyl starchate are introduced which soon disperses in the liquid ammonia under the influence of agitation. Add sodium wire piece-wise until the mixture turns blue (3.5 to 3.7 grams). The excess sodium, indicated by the blue color, was destroyed by small amounts of carbon dioxide.

The ammonia is removed by evaporation and the product is a 2-ethyl, 3-n-propyl, 6-sodium starchate.

The ethyl n-propyl sodium starchate so prepared is suspended in anhydrous toluene according to the following proportions:

100 grams starchate
200 ml. toluene
100 ml. n-butyl bromide

This mixture is then placed in a 1000 ml. bomb, sealed tight and autoclaved at 100° C. for about four hours. The supernatant liquid is decanted off and the product repeatedly extracted hot with anhydrous butanol to remove the sodium bromide formed. This purified product which is 2-ethyl, 3-n-propyl, 6-n-butyl starchate is washed with anhydrous toluene and dried.

*Example II.—Preparation of 2-n-butyl,3-n-propyl,6-ethyl starchate*

We prepared a 1000 ml. three-necked flask fitted with an efficient agitator, an ammonia inlet and a vent, and immersed two inches in a dry ice-acetone bath.

Dry ammonia gas is passed into the flask until 500 ml. of liquid ammonia have been condensed. We introduced 25 grams of dry starch which soon dispersed in the liquid ammonia under the influence of agitation. Sodium wire is added piece-wise until the mixture turns blue (3.5 to 3.7 grams). The excess sodium, indicated by the blue color, is destroyed by small amounts of carbon dioxide.

The ammonia is removed by evaporation and the product is a 6-monosodium starchate.

The sodium starchate so prepared is suspended with ethyl bromide in anhydrous toluene in the following proportions:

100 grams of the sodium starchate
200 ml. toluene
100 ml. of ethyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 6-monoethyl starchate which is washed with anhydrous toluene and then dried.

In a 1000 ml. three-necked flask fitted with an efficient agitator, a thermometer and a reflux condenser, we place the following:

100 grams of 6-monoethyl starchate
22 grams of sodium hydroxide
500 ml. butanol

We heat this mixture to 85° C. for two hours with vigorous agitation. We filter on suction, wash with butanol and then with toluene. The product, at this stage can be used directly for conversion to the organic starchate. The product however, dried to produce a 2-sodium-6-ethyl starchate. The 2-sodium-6-ethyl starchate must be protected from moisture and carbon dioxide during filtration, processing and drying. Drying was effected in a vacuum at temperatures below 100° C.

The sodium ethyl starchate prepared as described above is suspended with n-butyl bromide in anhydrous toluene in the following proportions:

100 grams of the sodium ethyl starchate
200 ml. toluene
100 ml. of n-butyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-n-butyl-6-ethyl starchate which is washed with anhydrous toluene and then dried.

In a 1000 ml. Claissen flask fitted with an efficient agitator and a thermometer we place the following:

100 grams of 2-n-butyl-6-ethyl starchate
20 grams of sodium hydroxide
750 ml. butanol We slowly distil with vigorous agitation until the distillation temperature ceases to rise (or when the temperature reaches 118° C.). We filter hot with elaborate precautions to avoid contamination by moisture and wash twice with anhydrous butanol then with anhydrous toluene.

The product at this stage is a 2-n-butyl-3-sodium-6-ethyl starchate. The dry product is unstable.

The starchate prepared as described above is suspended with n-propyl bromide in anhydrous toluene in the following proportions:

100 grams of the n-butyl sodium ethyl starchate
200 ml. toluene
100 ml. of the n-propyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-n-butyl, 3-propyl, 6-ethyl starchate. It is then washed with anhydrous toluene and then dried.

*Example III.—Preparation of 2-ethyl, 3-benzyl, 6-isopropyl starchate*

We prepared a 1000 ml. three-necked flask fitted with an efficient agitator, an ammonia inlet and a vent, and immersed two inches in a dry ice-acetone bath.

Dry ammonia gas is passed into the flask until 500 ml. of liquid ammonia have been condensed. We introduced 25 grams of dry starch which soon dispersed in the liquid ammonia under the influence of agitation. Sodium wire is added piece-wise until the mixture turns blue (3.5 to 3.7 grams). The excess sodium, indicated by the blue color, is destroyed by small amounts of carbon dioxide.

The ammonia is removed by evaporation and the product is a 6-monosodium starchate.

The sodium starchate so prepared is suspended with isopropyl bromide in anhydrous toluene in the following proportions:

100 grams of the sodium starchate
200 ml. toluene
100 ml. of isopropyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 6-monoisopropyl starchate which is washed with anhydrous toluene and then dried.

In a 1000 ml. three-necked flask fitted with an efficient agitator, a thermometer and a reflux condenser, we place the following:

100 grams of 6-monoisopropyl starchate
22 grams of sodium hydroxide
500 ml. butanol We heat this mixture to 85° C. for two hours with vigorous agitation. We filter on suction, wash with butanol and then with toluene. The product, at this stage can be used directly in the next step. The product was, however, dried to produce a dry 2-sodium 6-isopropyl starchate. The 2-sodium 6-isopropyl starchate must be protected from moisture and carbon dioxide during filtration, processing and drying. Drying was effected in a vacuum at temperatures below 100° C.

The sodium isopropyl starchate so prepared is suspended within anhydrous ethyl bromide toluene in the following proportions:

100 grams of the sodium isopropyl starchate
200 ml. toluene
100 ml. of ethyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-ethyl-6-isopropyl starchate which is washed with anhydrous toluene and then dried.

In a 1000 ml. three-necked flask fitted with an efficient agitator, a thermometer and a reflux condenser we place the following:

100 grams of 2-ethyl-6-isopropyl starchate
750 ml. 20% sodium hydroxide
100 ml. benzyl chloride We heat this mixture at 95 to 105° C. for four hours with vigorous agitation. We neutralize the reaction mixture with HCl (1:1) and concentrate to a sirup under a vacuum. We take up the ether in alcohol and purify in the usual manner. The product is a 2-ethyl,3-benzyl,6-isopropyl starchate.

*Example IV.—Preparation of 2-n-propyl,3-isopropyl, 6-benzyl starchate*

In a 1000 ml. three-necked flask fitted with an efficient agitator, a thermometer and a reflux condenser, we place the following:

100 grams of starch
22 grams of sodium hydroxide
500 ml. butanol

We heat this mixture to 85° C. for two hours with vigorous agitation. We filter on suction, wash with butanol and then with toluene. The products at this stage are a 2-sodium starchate and water in solution and can be used directly if desired. The product was, however, dried to separate 2-sodium starchate. The 2-sodium starchate must be protected from moisture and carbon dioxide during filtration, processing and drying. Drying was effected in a vacuum at temperatures below 100° C.

The sodium starchate so prepared is suspended with n-propyl bromide in anhydrous toluene in the following portions:

100 grams of the sodium starchate
200 ml. toluene
100 ml. of the n-propyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product which is a n-propyl starchate is washed with anhydrous toluene and then dried.

In a 1000 ml. Claissen flask fitted with an efficient agitator and a thermometer the following are placed:

100 grams of n-propyl starchate
20 grams of sodium hydroxide
750 ml. butanol

Slowly distil with vigorous agitation until the distillation temperature ceases to rise (or when the temperature reaches 118° C.). Filter hot with elaborate precautions to avoid contamination by moisture and wash twice with anhydrous butanol then with anhydrous toluene.

The product, at this stage, is a 2-n-propyl, 3-sodium starchate and can be used directly. (The dry product is unstable).

The n-propyl, sodium starchate so prepared is suspended with isopropyl bromide in anhydrous toluene in the following proportions:

100 grams of the n-propyl sodium starchate
200 ml. toluene
100 ml. of isopropyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-n-propyl, 3-isopropyl starchate and is washed with anhydrous toluene and then dried.

In a 1000 ml. three-necked flask fitted with an efficient agitator, a thermometer and a reflux condenser, we place the following:

100 grams of 2-n-propyl, 3-isopropyl starchate
750 ml. 20% sodium hydroxide
100 ml. benzyl chloride We heat this mixture at 95 to 105° C. for four hours with vigorous agitation. We neutralize the reaction mixture with HCl (1:1) and concentrate to a sirup under a vacuum. We take up the ether in alcohol and purify in the usual manner.

*Example V.—Preparation of 2-methyl, 3-isopropyl, 6-n-propyl starchate*

A 1000 ml. three-necked flask fitted with an efficient agitator, an ammonia inlet and a vent, and immersed two inches in a dry ice-acetone bath is prepared.

We pass dry ammonia gas into the flask until 500 ml. of liquid ammonia have been condensed. We introduce 25 grams of dry starch which soon disperses in the liquid ammonia under the influence of agitation. We add sodium wire piecewise until the mixture turns blue (3.5 to 3.7 grams). The excess sodium indicated by the blue color, is destroyed by small amounts of carbon dioxide.

The ammonia is removed by evaporation and the product is a 6-monosodium starchate.

The sodium starchate so prepared is suspended with n-propyl bromide in anhydrous toluene in the following proportions:

100 grams of the sodium starchate
200 ml. toluene
100 ml. of n-propyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 6-mono-n-propyl starchate which is washed with anhydrous toluene and then dried.

In a 1000 ml. three-necked flask fitted with an efficient agitator, a thermometer and a reflux condenser, we place the following:

100 grams of 6-n-propyl starchate
22 grams of sodium hydroxide
500 ml. butanol

We heat this mixture to 85° C. for two hours with vigorous agitation. We filter on suction, wash with butanol and then with toluene. The product, at this stage can be used directly for conversion to an organic starchate. The product, was, however dried to produce a dry 2-sodium 6-n-propyl starchate. The 2-sodium 6-n-propyl starchate must be protected from moisture and carbon dioxide during filtration, processing and drying. Drying was effected in a vacuum at temperatures below 100° C.

The sodium n-propyl starchate so prepared is then suspended with methyl iodide in anhydrous toluene in the following proportions:

100 grams of the sodium n-propyl starchate
200 ml. toluene
100 ml. of the methyl iodide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaI formed. This purified product is a 2-methyl, 6-n-propyl starchate. It is then washed with anhydrous toluene and then dried.

In a 1000 ml. three-necked flask fitted with an efficient agitator and a thermometer, we place the following:

100 grams of 2-methyl, 6-n-propyl starchate
20 grams sodium hydroxide
750 ml. butanol We slowly distil with vigorous agitation until the distillation temperature ceases to rise. We filter hot, taking strict precautions to avoid contamination by moisture and wash twice with anhydrous butanol and then once more with anhydrous toluene. The product is a 2-methyl, 3-sodium-6-n-propyl starchate.

The starchate prepared as described above is suspended with isopropyl bromide in anhydrous toluene in the following proportions:

100 grams of the methyl, sodium, n-propyl starchate
200 ml. toluene
100 ml. of isopropyl bromide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-methyl,3-isopropyl,6-n-propyl starchate. It is then washed with anhydrous toluene and then dried.

*Example VI.—Preparation of 2-n-propyl,3-methyl,6-isopropyl starchate*

In a 1000 ml. three-necked flask fitted with an efficient agitator, a thermometer and a reflux condenser, we placed the following:

100 grams of starch
22 grams of sodium hydroxide
500 ml. butanol

We heated this mixture to 85° C. for two hours with vigorous agitation. We filtered on suction, washed with butanol and then with toluene. The products are a 2-sodium starchate and water in solution. They can be used directly if desired. The starchate product was, however, dried to separate the 2-sodium starchate. The 2-sodium starchate must be protected from moisture and carbon dioxide during filtration, processing and drying. Drying was effected in a vacuum at temperatures below 100° C.

The sodium starchate so prepared is suspended with n-propyl bromide in anhydrous toluene in the following proportions:

100 grams of the sodium starchate
200 ml. toluene
100 ml. of n-propyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product which is a 2-n-propyl starchate is then washed with anhydrous toluene and is then dried.

In a 1000 ml. Claissen flask fitted with an efficient agitator and a thermometer, we place the following:

100 grams of 2-n-propyl starchate
20 grams of sodium hydroxide
750 ml. butanol

We slowly distil with vigorous agitation until the distillation temperature ceases to rise. We filter hot with elaborate precautions to avoid contamination by moisture and wash twice with anhydrous butanol and then with anhydrous toluene. The product is a 2-n-propyl,3-sodium starchate. (The dry product is unstable.)

The starchate so prepared is then suspended with methyl iodide in anhydrous toluene in the following proportions:

100 grams of the n-propyl sodium starchate
200 ml. toluene
100 ml. of the methyl iodide This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaI formed. This purified product is a 2-n-propyl,3-methyl starchate. It is then washed with anhydrous toluene and then dried.

We prepared a 1000 ml. three-necked flask fitted with an efficient agitator, an ammonia inlet and a vent, and immersed 2 inches in a Dry Ice-acetone bath.

We passed dry ammonia gas into the flask until 500 ml. of liquid ammonia have been condensed. We introduced 25 grams of dry starch which soon dispersed in the liquid ammonia under the influence of agitation. Sodium wire is added piece-wise until the mixture turns blue (3.5 to 3.7 grams). The excess sodium indicated by the blue color, was destroyed by small amounts of carbon dioxide.

The ammonia was removed by evaporation and the product used directly to prepare the tri-organic starchate.

The starchate so prepared is then suspended with isobutyl bromide in anhydrous toluene in the following proportions:

100 grams of the starchate
200 ml. toluene
100 ml. of the isobutyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 2-n-propyl,3-methyl,6-isobutyl starchate. It is then washed with anhydrous toluene and then dried.

*Example VII.—Preparation of 2-methyl, 6-ethyl starchate*

We prepared a 1000 ml. three-necked flask fitted with an efficient agitator, an ammonia inlet and a vent, and immersed two inches in a Dry Ice-acetone bath.

Dry ammonia gas is passed into the flask until 500 ml. of liquid ammonia have been condensed. 25 grams of dry starch is introduced which soon disperses in the liquid ammonia under the influence of agitation. Sodium wire is added piece-wise until the mixture turns blue (3.5 to 3.7 grams). The excess sodium indicated by the blue color, is destroyed by small amounts of carbon dioxide.

The ammonia is removed by evaporation and the product which is a 6-sodium starchate, is used directly as follows:

The sodium starchate is suspended with ethyl bromide in anhydrous toluene according to the following:

100 grams of the sodium starchate
200 ml. toluene
100 ml. of ethyl bromide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaBr formed. This purified product is a 6-ethyl starchate. It is then washed with anhydrous toluene and dried.

In a 1000 ml. three-necked flask fitted with an efficient agitator, a thermometer and a reflux condenser, we place the following:

100 grams of 6-ethyl starchate
22 grams of sodium hydroxide
500 ml. butanol

We heat this mixture to 85° C. for two hours with vigorous agitation. We filter on suction, wash with butanol and then with toluene. The product is a 2-sodium, 6-ethyl starchate. It can be used directly. The product was, however, dried to produce a dry 2-sodium, 6-ethyl starchate. (The starchate must be protected from moisture and carbon dioxide during filtration, processing and drying.) Drying was effected in a vacuum at temperatures below 100° C.

The sodium ethyl starchate so prepared is then suspended with methyl iodide in anhydrous toluene in the following proportions:

100 grams of the starchate
200 ml. toluene
100 ml. of methyl iodide

This mixture is placed in a 1000 ml. bomb (glass lined), sealed tight and autoclaved at 100° C. for about four hours.

The supernatant liquid is decanted off and the product repeatedly extracted hot with anhydrous butanol to remove the NaI formed. This purified product is a 2-methyl, 6-ethyl starchate. It is then washed with anhydrous toluene and then dried.

*Example VIII.—Preparation of polymethyl celluloses*

*Alkali soluble cellulose preparation.*—Native cellulose was extracted with 17.5% aqueous caustic soda solution at 20° C. The insoluble alpha cellulose was removed by filtration through asbestos. The filtrate was neutralized whereby the beta-cellulose was precipitated. The beta form was freed of the soluble gamma-cellulose by washing with water.

*Cellulose-oxycellulose preparation.*—The purified beta-cellulose was suspended in 100 parts of 0.04 N sodium hypochlorite solution of pH 8.0 at 25° C. for 48 hours whereby a part of the cellulose was converted into oxy-cellulose. The cellulose mixture was thoroughly washed with distilled water, suspended in n-butanol and dried azeotropically with agitation by warming to 95° C.

*Sodium cellulosate preparation.*—We mixed:

100 grams of the mixed cellulose-oxycellulose
35 grams of sodium ethylate
1800 ml. of n-butanol This mixture was reacted with vigorous agitation for two hours at 92–95° C. whereby the water in the reaction mixture was removed as the butanol azeotrope. The ethanol produced by the reaction was likewise removed. Analysis of the reaction product indicated that 8.7 grams of sodium had been reacted with the cellulose. The reaction mixture was filtered and washed with n-butanol to free it from unreacted alkali. The sodium cellulosate was returned to the reaction flask with 1800 ml. of n-butanol.

*β-Hydroxyethyl cellulosate preparation.*—To the sodium cellulosate suspension in butanol was added: 50 ml. ethylene chlorohydrin. This mixture was heated at 92–95° C. for two hours or until etherification was complete (generally less than two hours). The cellulose ether was removed by filtration, washed with butanol and finally with ether and air dried. The product was a β-hydroxyethyl cellulosate. Air dry weight 147.4 grams (dry weight 120.1 grams). Overall yield 76%.

The monoether product of this reaction is still a trihydroxy derivative and could have been reacted further:

1. To form the triester according to the usual accepted methods.

2. To form the triether according to the usual accepted methods.

a. By alkali methods.
b. By metallic sodium methods.

3. To form any other derivatives requiring a hydroxyl group for reaction.

We formed a triether as follows:
We mixed:

104 grams of dry β-hydroxyethyl cellulosate
1500 ml. aqueous 10% NaOH and then added slowly portionwise with vigorous agitation 100 ml. methyl sulfate. The rate of addition was such that the temperature of the mixture did not rise above 40° C. After twelve hours the mixture was heated to boiling to saponify the unreacted methyl sulfate. The mixture was cooled and poured into 2000 ml. of 95% ethanol. The coagulated methylated product was washed with 50% ethanol, allowed to drain overnight and dried. Air dry weight was 135 grams. The product is a mixture of about 75% 2-β-methoxyethyl 3,6-dimethyl cellulose and about 25% 2,3,6-trimethyl cellulose.

*Example IX.—Preparation of dextrin ether*

A commercial corn dextrin of the so-called alkali-converted type was used. We mixed:

200 grams of dextrin
56 grams of KOH
900 ml. of n-butanol

This mixture was heated with vigorous agitation for two hours at 92-95° C. whereby the water evolved in the reaction was removed azeotropically. Since preliminary tests showed that the unreacted alkali was only about .04 N in the solution at this point the mixture was not filtered for purification. The product was a sodium dextrinate.

In another flask, we mixed:

84 grams of sodium bicarbonate
95 grams of monochloracetic acid
300 ml. of butanol The mixture was stirred with warming until the reaction mixture was neutral and the butanol had been evaporated to a thick slurry. This slurry of sodium monochloroacetate was then added to the sodium dextrinate and this mixture was heated with vigorous agitation to 92-95° C. for four hours. The reaction product was filtered off, washed with butanol and then with ether and air dried. Air dry weight 342 grams (dry weight 312 g.). Overall yield 93% of dextrin mono-glycolate sodium salt.

The monoether product of this reaction was still a carboxyl dihydroxy derivative. It could have been reacted further:

1. To form the triester according to the usual accepted methods by esterifying the carboxyl as well as the hydroxyls.
2. To form the triether according to the usual accepted methods i. e., by adding two other ether groups in addition to one already present.

a. By alkali methods.
b. By metallic sodium methods.

3. To form any other derivative requiring a hydroxyl or carboxyl group for reaction.

We formed a triether as follows:

*Preparation of dimethyl dextrinate from dextrinate.*—We took 156 grams of air dried dextrin monoglycolate prepared as above and mixed 1500 ml. of aqueous 10% sodium hydroxide. We added slowly portionwise with vigorous agitation, 100 ml. of methyl sulfate. The rate of addition was such that the temperature of the mixture did not rise above 40° C. After twelve hours the mixture was heated to boiling to saponify the unreacted methyl sulfate. The mixture was cooled and poured into 2000 ml. of 95% ethanol. The coagulated methylated product was washed with 50% ethanol, allowed to drain overnight and dried. The air dry weight was 175 grams. The product is a 2-carboxyethyl sodium salt 3,6-dimethyl-dextrinate.

*Example X.—Preparation of locust bean gum ether*

We took:

200 grams of locust bean gum
40 grams of sodium hydroxide
450 ml. of ethylene glycol
450 ml. of n-butanol This mixture was heated for two hours with vigorous agitation at 92-95° C. and the water evolved in the reaction was removed as the butanol azeotrope.

In another flask, we mixed:

47 grams of sodium bicarbonate
50 grams of commercial monochloroacetic acid
200 ml. n-butanol The mixture was stirred with warming until the reaction mixture was neutralized and the butanol had been evaporated to a thick slurry. This slurry of sodium monochloroacetate was then added to the sodium gum and the mixture was heated with vigorous agitation to 92-95° C. for four hours.

Then we added 50 ml. of ethylene chlorohydrin and continued the heating for another two hours or until the reaction mixture was neutral (about 15-20 minutes).

The reaction product was filtered off, washed with butanol and then with ether and air dried. It was a monoether gum or gum glycolate. The air dry weight was 319 grams (dry weight 293 grams). The over-all yield could not be calculated because the constitution of commercial locust bean gum is unknown. If assumed to be hexosan the yield was approximately 90%.

The monoether product of this reaction is still a carboxyl hydroxy derivative and could have been reacted further:

1. To form the polyester (diester from the pentosan and triester from the hexosan) according to the usual accepted methods, i. e. by esterifying the caroboxyl groups also.
2. To form the triether according to the usual accepted methods as by adding one more ether group to the pentosan and by adding two more ether groups to the hexosan.

a. By alkali methods
b. By metallic sodium methods.

3. To form any other derivatives requiring a hydroxyl group or carboxyl for reaction.

We prepared a triether gum as follows. We mixed:

150 grams of gum glycolate
1500 ml. of 10% aqueous NaOH and added slowly portionwise with vigorous agitation 150 ml. of ethyl sulfate. The rate of addition was such that the temperature of the mixture did not rise above 40° C. After twelve hours the mixture was heated to boiling to saponify the unreacted ethyl sulfate. The mixture was cooled and poured into 2000 ml. of 95% ethanol. The coagulated methylated product was washed with 50% ethanol and allowed to drain overnight. The product is mainly a mixture of 2-carboxyethyl sodium salt, 3,6-diethyl gum, and 2 ethoxy, 3,6-diethyl gum. The air dry weight was 190 grams.

*Example XI.—Preparation of monomethyl glucoside*

We pretreated the sugar according to a usual technique as follows:

Dry hydrogen chloride was passed into 500 ml. anhydrous, acetone-free, methanol, with ice cooling exclusion of moisture, until the weight was increased 10 grams. This solution is then diluted to 4000 ml. with anhydrous, acetone-free methanol.

To this 0.25% hydrogen chloride was added 1000 grams of finely powdered anhydrous d-glucose. This was 5.54 moles. An equivalent molar amount of another sugar could have been used. The mixture was boiled under reflux for seventy-two hours. The clear pale yellow solution was cooled to 0° C., and crystallization induced by the usual methods. After twelve hours at 0° C., the first crop of crystals was filtered by suction and washed with cold methanol.

The mother liquor and washings were returned to the original flask and again boiled for seventy-two hours under reflux. The liquid was concentrated to 1600 ml. and again cooled to 0° C. and crystallized at 0° C. for twenty-four hours. The second crop of crystals was filtered by suction and washed with cold methanol.

The mother liquor and washings were concentrated to about 600 ml. chilled to 0° C. and the mush allowed to crystallize at that temperature for twenty-four hours, diluted with twice its weight of absolute methanol and let stand for another twenty-four hours. The third crop of crystals was filtered by suction and washed with cold methanol.

The combined crystals (520–530 grams) were purified by recrystallization from five parts of methanol with the use of decolorizing carbon. The product was an α-methyl glucoside.

We prepared a 1000 ml. three-necked flask fitted with an efficient agitator, an ammonia inlet and a vent and immersed two inches in a Dry Ice-acetone bath.

Dry ammonia gas was passed into the flask until 500 ml. of liquid ammonia had been condensed. Then 20 grams α-methyl glucoside was added and this soon dispersed in liquid ammonia under the influence of agitation. Metallic wire was added piece-wise until the mixture turned blue (2.1 to 2.3 grams). The excess sodium, indicated by the blue color, was destroyed by small amounts of carbon dioxide.

The ammonia was removed by evaporation and the product remaining was mono-sodium α-methyl glucoside.

This product was suspended in methyl iodide and placed in a 500 ml. glass-lined bomb and autoclaved at 100° C. for about four hours to produce monomethyl α-methyl glucoside. The excess methyl iodide was evaporated off leaving the sirupy ether. This was characterized by the methoxy determination by which it was shown that the sirup contained two methoxyl groups per glucose unit. However, it has not been further characterized with respect to melting point and other physical constants.

The monoether product of this reaction was still a tri-hydroxy derivative and could have been reacted further.

1. To form the triester according to the usual accepted methods.
2. To form the tetra-ether according to the usual accepted methods.
    a. By alkali methods.
    b. By metallic sodium methods.
3. To form any other derivatives requiring a hydroxyl group for reaction.

We formed a triether glucoside as follows:

*Preparation of polyether glucoside.*—The sirupy monomethyl-α-methyl glucoside was processed further without attempting crystallization. It was dispersed in:

100 ml. butanol
4 grams NaOH and heated with vigorous agitation for two hours at 92–95° C. to permit volatilization of the water evolved in the reaction. At the end of this period the monosodium monomethyl α-methyl glucoside was separated as a sirupy material by addition of some benzene. The supernatant liquid was decanted off and replaced with benzene. Ten ml. ethyl iodide was added and the mixture was again autoclaved at 100° C. for about four hours to produce monomethyl monoethyl α-methyl glucoside with the ethyl being attached on carbon 2. The excess ethyl iodide and benzene were evaporated off and replaced with pentanol. Four grams of NaOH was added. This mixture was heated with vigorous agitation for four hours permitting the water evolved to escape as the azeotrope at about 96° C. After the atmosphere above the reaction mixture reached 120° C., the mixture was cooled and 10 ml. of ethylene chlorohydrin was added and the heating continued at 92–95° C. for two hours. The product, 2-ethyl, 3-β-hydroxy-ethyl-6-methyl-α-methyl glucoside was separated as a sirup on the addition of benzene. After standing a month, the ether showed a tendency to crystallize but the product has not yet been crystallized.

*EXAMPLE XII.—Preparation of guar gum ether*

We mixed:

200 grams guar gum
40 grams NaOH
1000 ml. pentanol-1

We heated this mixture with vigorous agitation for two hours at 100° C. permitting the water to escape from the reaction as the azeotrope. Methyl chloride gas was allowed to bubble into the reaction mixture until the etherification was complete as indicated by the disappearance of the alkali. The product at this stage was 2-methyl guar gum. Considerable methyl chloride was wasted because no provision was made to retain it in the reaction system, however, the etherification proceeded nicely. Without filtering, another 40 grams of NaOH was introduced and the reaction temperature increased to that required to bring the hydroxyl on carbon three to a reaction, i. e., 120–130° C. After the water formed by the reaction had been removed by the azeotrope, the part product (2-methyl, 3-sodium gum) was filtered rapidly and treated with ethyl bromide in excess under pressure at 100° C. for four hours. The product 2-methyl, 3-ethyl gum was recovered by letting the excess ethyl iodide distil off.

Approximately 10 grams of this ether was dissolved in 500 ml. anhydrous liquid ammonia immersed in a Dry Ice-acetone bath. To this rapidly agitated solution was added sodium piecewise (about 1 gram) until the reaction mixture assumed a dark blue color. The excess sodium was destroyed with carbon dioxide. Then 25 ml. ethylene chlorohydrin was added to the mixture and the ammonia evaporated off and the mixture was then warmed to about 81° C., diluted with 50 ml. of butanol, filtered and washed with butanol and ether to yield 12 grams of 2-methyl, 3-ethyl, β-hydroxy-ethyl ether.

The remaining 2-methyl, 3-sodium gum in pentanol was treated with 100 ml. ethylene chlorohydrin and heated at 95-100° C. for two hours with vigorous stirring. The product was recovered by filtration, washed with butanol and then with ether and air dried (2-methyl 3-β-hydroxy-ethyl gum).

Approximately 10 grams of this ether was treated with metallic sodium in liquid ammonia as before except that 2–2.5 grams of sodium was consumed. Twenty-five ml. ethyl lactate was added and the ammonia allowed to evaporate. The mixture was warmed, diluted with butanol, filtered and washed with butanol, then ether and air dried to give about 15 grams crude 2-methyl, 3-β-ethoxyethyl, ethyl gum.

*EXAMPLE XIII.—Preparation of polyether dextrin*

A commercial corn dextrin of the so-called alkali converted type was used. 16 grams of dextrin was stirred vigorously in 500 ml. of liquid ammonia (in Dry Ice acetone bath). Sodium wire was added until the mixture assumed a permanent blue color (2.0–2.3 grams). The excess sodium was destroyed by a little carbon dioxide. Methyl chloride was bubbled into the mixture until the dextrin was etherified (about 40-60 minutes). The ammonia was allowed to evaporate, and the monomethyl dextrin was covered with 150 ml. of butanol and 4 grams of NaOH were added. This mixture was heated with vigorous agitation for two hours at 92–95° C. and 25 ml. ethyl oxalate was added. The etherification was almost spontaneous and the product recovered by filtration, washed with butanol and ether.

The ether-wet 2-ethyl monomethyl dextrin was suspended in 150 ml. of pentanol-1 and 4 grams NaOH were added. This mixture was heated with vigorous agitation until the atmosphere above the mixture had reached a temperature of 120–125° C. The mixture was cooled and 25 ml. ethylene chlorohydrin were added and the mixture again heated 92–95° C. for two hours. It was filtered and the cake washed with butanol and ether and then air dried. The air dry weight was approximately 520 grams.

The product was 2-ethyl, 3-β-hydroxyethyl, 6-methyl dextrin. It could be further reacted by virtue of the hydroxyl group introduced on carbon-3. Such reaction might be esterification, etherification, etc. to produce most complex substances.

The discovery that glucopyranose polymer in which the hydroxyl hydrogen of the number 2 carbon has been replaced by an alkali metal atom and in which this alkali metal atom has been replaced by an alkyl radical to form a 2-alkyl glucopyranose polymer, may be further selectively reacted by mixing the substituted polymer with an alkali metal dissolved in liquid ammonia so that the hydroxyl hydrogen of both the 3 and the 6 carbon may be replaced and then the substituted 2 alkyl, 3, 6, alkali glucopyranose polymer so formed may be further reacted to selectively replace the alkali metal with cations derived from salts other than alkali metal and ammonium salts, is also disclosed and the processes and products of this discovery are disclosed and claimed in our copending application Serial No. 234,642.

The discovery that with starch (as distinguished from cellulose) the reaction caused by the mixing of starch with an alkali metal dissolved in liquid ammonia replaces only the hydrogen on the number 6 carbon, that this carbon may be blocked by reacting with an ethereal salt, and that further selective reactions may be accomplished by further reacting glucopyranose polymer so processed with an alkali metal hydroxide in an alcoholic non-aqueous system, is disclosed and the processes and the products of the reaction of this discovery are disclosed in full and claimed in divisional application Serial No. 206,258.

It is to be understood that the above described embodiments of our invention are for the purpose of illustration only and various changes may be made therein without departing from the spirit and scope of our invention.

We claim:

1. A substantially uniformly substituted glucopyranose polymer consisting of interlinked and polymerized substantially uniformly substituted glucopyranose units each having the following structural formula

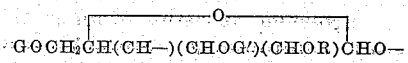

where each G represents an identical cation selected from the group consisting of hydrogen, ethereal salt cations, and cations of metal salts other than salts of ammonia, where each G' represents an identical cation selected from the group consisting of ethereal salt cations, and cations of metal salts other than salts of ammonia, and where each R represents an identical ethereal salt cation and is different from G and G'; provided that where G as a cation other than hydrogen, G' must be an ethereal salt cation, and that where G and G' are ethereal salt cations, they must be different.

2. A substantially uniformly substituted glucopyranose polymer consisting of interlinked and polymerized substantially uniformly substituted glucopyranose units each having the following structural formula

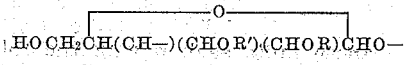

where each R represents an identical ethereal salt cation and each R' represents an identical ethereal salt cation different from R.

3. A substantially uniformly substituted glucopyranose polymer consisting of interlinked and polymerized substantially uniformly substituted glucopyranose units each having the following structural formula

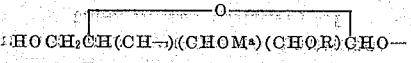

where each R represents an identical ethereal salt cation and each M$^a$ represents an identical alkali metal cation.

4. A substantially uniformly substituted glucopyranose polymer consisting of interlinked and polymerized substantially uniformly substituted glucopyranose units each having the following structural formula

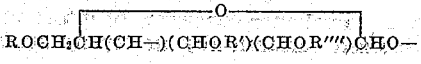

where each R represents an identical ethereal salt cation, where each R' represents an identical ethereal salt cation different from R, and where each R'''' represents an identical ethereal salt cation from a different homologous series from R.

5. A substantially uniformly substituted glucopyranose polymer consisting of interlinked and polymerized substantially uniformly substituted glucopyranose units each having the following structural formula

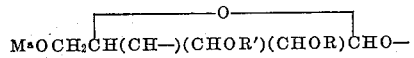
M<sup>a</sup>OCH₂CH(CH—)(CHOR')(CHOR)CHO— where each M<sup>a</sup> represents an identical alkali metal cation, where each R represents an identical ethereal salt cation and each R' represents an identical ethereal salt cation different from R.

6. A substantially uniformly substituted glucopyranose polymer consisting of interlinked and polymerized substantially uniformly substituted glucopyranose units each having the following structural formula

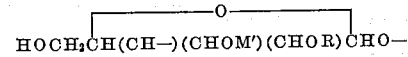
HOCH₂CH(CH—)(CHOM')(CHOR)CHO— where each R represents an identical ethereal salt cation and each M' represents an identical cation of a metal salt other than salts of alkali metals and of ammonia.

7. A substantially uniformly substituted glucopyranose polymer consisting of interlinked and polymerized substantially uniformly substituted glucopyranose units each having the following structural formula

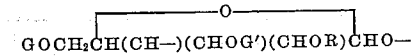
GOCH₂CH(CH—)(CHOG')(CHOR)CHO— where each G represents an identical cation selected from the group consisting of hydrogen, ethereal salt cations, and cations of metal salts other than salts of ammonia, where each G' represents an identical cation selected from the group consisting of ethereal salt cations, and cations of metal salts other than salts of ammonia, and each R represents an identical ethereal salt cation different from G and from a different homologous series from G'; provided that where G is a cation other than hydrogen, G' must be an ethereal salt cation.

8. A substantially uniformly substituted glucopyranose polymer consisting of interlinked and polymerized substantially uniformly substituted glucopyranose units each having the following structural formula

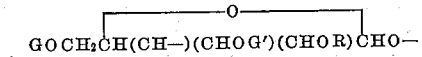
GOCH₂CH(CH—)(CHOG')(CHOR)CHO— where each G represents an identical cation selected from the group consisting of hydrogen, ethereal salt cations, and cations of metal salts other than salts of ammonia, where each G' represents an identical cation selected from the group consisting of ethereal salt cations, and cations of metal salts other than salts of ammonia, and where each R represents an identical ethereal salt cation different from G and G'; provided that where G is a cation other than hydrogen, G' must be an ethereal salt cation, and that where both G and G' are ethereal salt cations, G' must be from a different homologous series from G.

9. A substantially uniformly substituted glucopyranose polymer consisting of interlinked and polymerized substantially uniformly substituted glucopyranose units each having the following structural formula

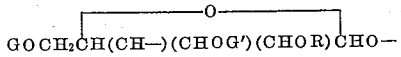
GOCH₂CH(CH—)(CHOG')(CHOR)CHO— where each G represents an identical cation selected from the group consisting of hydrogen, ethereal salt cations, and cations of metal salts other than salts of ammonia, where each G' represents an identical cation selected from the group consisting of ethereal salt cations, and cations of metal salts other than salts of ammonia, and where each R represents an identical ethereal salt cation different from G' and from a different homologous series from G, and that where G is a cation other than hydrogen, G' must be an ethereal salt cation.

10. A substantially uniformly substituted glucopyranose polymer consisting of interlinked and polymerized substantially uniformly substituted glucopyranose units each having the following structural formula

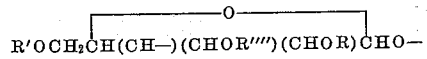
R'OCH₂CH(CH—)(CHOR'''')(CHOR)CHO— where each R represents an identical ethereal salt cation, where each R' represents an identical ethereal salt cation differing from R, and each R'''' represents an identical ethereal salt cation from a different homologous series from R.

11. A substantially uniformly substituted glucopyranose polymer consisting of interlinked and polymerized substantially uniformly substituted glucopyranose units each having the following structural formula

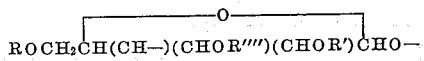
ROCH₂CH(CH—)(CHOR'''')(CHOR')CHO— where each R represents an identical ethereal salt cation, where each R' represents an identical ethereal salt cation differing from R, and each R'''' represents an identical ethereal salt cation from a different homologous series from R.

12. A new composition of matter consisting of uniformly substituted glucopyranose polymers, having interconnected polymerized units, the general structural formula of each of which is

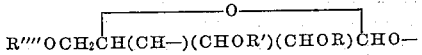
R''''OCH₂CH(CH—)(CHOR')(CHOR)CHO— wherein each R, R' and R'''' represents a cation derived from an ethereal salt and in which each cation represented by R is identical with each other cation represented by R but is from a different homologous series from each of the cations represented by R'''' and wherein each R' is identical with each other cation represented by R' but is different from each cation represented by R, and where each cation represented by R'''' is identical with each other cation represented by R''''.

13. A new composition of matter consisting of uniformly substituted glucopyranose polymers each unit having the general structural formula of

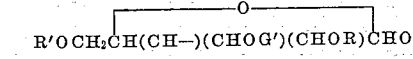
R'OCH₂CH(CH—)(CHOG')(CHOR)CHO— wherein each R represents an identical ethereal salt cation, wherein each G' represents an identical cation differing from R and selected from the group consisting of ethereal salt cations and cations of metal salts other than of ammonia and wherein each R' represents an identical ethereal salt cation different from R.

14. A new composition of matter consisting of uniformly substituted glucopyranose polymers, having interconnected polymerized units, the general structural formula of each of which is

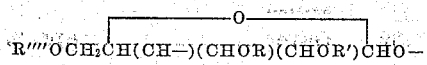
R''''OCH₂CH(CH—)(CHOR)(CHOR')CHO— wherein each R, R' and R'''' represents a cation derived from an ethereal salt, and in which each cation represented by R is identical with each other cation represented by R, wherein each R' is identical with each other cation represented by R' but is different from each cation represented by R, wherein each cation represented by R'''' is identical with each other cation represented by R'''' but is from a different homologous series from each cation represented by R.

15. A new composition of matter consisting of uniformly substituted glucopyranose polymers having substituted glucopyranose units the general structural formula of each of which is

R'OCH₂CH(CH—)(CHOR)(CHOR'''')CHO— wherein each R represents an identical ethereal salt cation, where each R' represents an identical ethereal salt cation differing from R, and each R'''' represents an identical ethereal salt cation from a different homologous series from R.

16. A new composition of matter consisting of uniformly substituted glucopyranose polymers having substituted glucopyranose units the general structural formula of each of which is

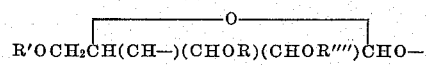
GOCH₂CH(CH—)(CHOR')(CHOR)CHO— wherein G is a cation selected from the class of cations consisting of hydrogen, ethereal salt cations, and cations of metal salts other than salts of ammonia, wherein R represents an identical ethereal salt cation different from G, and R' is an ethereal salt cation different from R and G.

17. A new composition of matter consisting of selectively 2,3-substituted glucopyranose polymers in which cations have replaced the hydroxyl hydrogen on the carbons in the 2 position of the glucopyranose units and are uniformly alkyl groups, and in which cations have replaced the hydroxyl hydrogen on the carbon in the 3 position of the glucopyranose units and are uniformly cations of metal salts.

18. A new article of manufacture consisting of selectively 2,3-substituted starchates in which alkyl groups are uniformly substituted for the hydroxyl hydrogen cations of the carbon in the 2 position of the glucopyranose units and in which cations have replaced the hydroxyl hydrogen cations on the carbon in the 3 position of the glucopyranose units and are uniformly alkali metal cations.

19. A new composition of matter consisting of a substituted glucopyranose polymer having interconnected polymerized units each such unit having a structural formula of

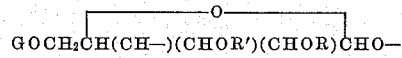
G'OCH₂CH(CH—)(CHOG')(CHOR)CHO wherein R is an alkyl radical, wherein G' is a cation differing from R and derived from a salt other than ammonium salts.

20. A new composition of matter consisting of a substituted glucopyranose polymer having interconnected polymerized units each such unit having a structural formula of

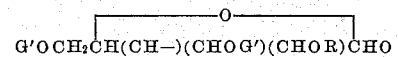
R''''OCH₂CH(CH—)(CHOR'''')(CHOR)CHO— wherein each R represents an identical cation derived from an ethereal salt, and wherein each R'''' is an identical cation derived from an ethereal salt and from a different homologous series from R.

21. A new composition of matter consisting of a substituted glucopyranose polymer having interconnected polymerized units each such unit having a structural formula of

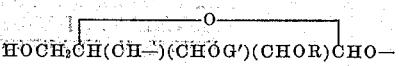
HOCH₂CH(CH—)(CHOG')(CHOR)CHO— wherein R is an alkyl radical, wherein G' is a cation differing from R and derived from a salt other than an ammonium salt.

22. A new composition of matter consisting of a substituted starchate having interconnected polymerized starch units each such unit having a structural formula of

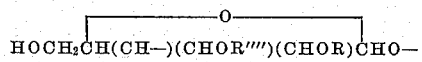
HOCH₂CH(CH—)(CHOR'''')(CHOR)CHO— wherein each R represents an identical ethereal salt cation and wherein each R'''' represents an identical ethereal salt cation from a different homologous series from R.

23. A new composition of matter consisting of a substituted starchate having interconnected polymerized starch units each such unit having a structural formula of

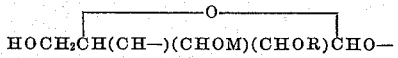
HOCH₂CH(CH—)(CHOM)(CHOR)CHO— wherein R is an ethereal salt cation and wherein M is a cation derived from a metal salt other than ammonium salts.

24. A new composition of matter consisting of a substituted starchate having interconnected polymerized starch units each such unit having a structural formula of

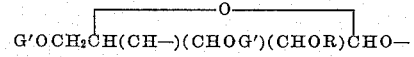
G'OCH₂CH(CH—)(CHOG')(CHOR)CHO— wherein each R is an ethereal salt cation, wherein each G' is a cation derived from a salt other than ammonium salts and provided that where G' is an ethereal salt cation it is a cation of a different homologous series from R.

25. A new composition of matter according to claim 19 wherein each G' substituent is a metal atom.

26. A new composition of matter according to claim 19 wherein each G' substituent is a cation derived from a metal salt other than an alkali metal salt.

27. A new composition of matter according to claim 19 wherein each G' substituent is an alkali metal atom.

28. A new composition of matter according to claim 13 wherein the longest straight chain of the ethereal salt cation designated R has not more than four carbon atoms, wherein the R' substituent on the No. six carbon is a different alkyl group of which the longest straight chain has not more than four carbon atoms, and wherein the G' constituent on the No. three carbon is a cation derived from a non-alkali metal salt.

29. A new composition of matter according to claim 13 wherein the longest straight chain of the alkyl group designated R has not more than four carbon atoms, wherein the G' substituent on the No. three carbon is a metal atom, and wherein the R' substituent on the No. six carbon is an alkyl group different from R of which the longest straight chain has not more than 4 carbon atoms.

30. A new composition of matter according to claim 13 wherein the longest straight chain of the alkyl group designated R has not more than four carbon atoms, wherein the G' substituent on the No. three carbon is an alkali metal atom and the R' substituent on the No. six carbon is an alkyl group different from the alkyl group of R of which the longest straight chain has not more than four carbon atoms.

KENNETH M. GAVER.
    ESTHER P. LASURE.
    DERK V. TIESZEN.

References Cited in the file of this patent

UNITED STATES PATENTS

| Number | Name | Date |
|---|---|---|
| 2,294,925 | Miller | Sept. 8, 1942 |
| 2,397,732 | Gaver | Apr. 2, 1946 |